US012277906B2

(12) United States Patent
Zhao et al.

(10) Patent No.: US 12,277,906 B2
(45) Date of Patent: Apr. 15, 2025

(54) PIXEL DRIVING CIRCUIT, DISPLAY PANEL AND DISPLAY DEVICE

(71) Applicant: BOE TECHNOLOGY GROUP CO., LTD., Beijing (CN)

(72) Inventors: Xuliang Zhao, Beijing (CN); Jianchao Zhu, Beijing (CN); Lujiang Huangfu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/029,829

(22) PCT Filed: Apr. 7, 2022

(86) PCT No.: PCT/CN2022/085538
§ 371 (c)(1),
(2) Date: Mar. 31, 2023

(87) PCT Pub. No.: WO2023/193181
PCT Pub. Date: Oct. 12, 2023

(65) Prior Publication Data
US 2024/0363071 A1 Oct. 31, 2024

(51) Int. Cl.
*G09G 3/3241* (2016.01)

(52) U.S. Cl.
CPC ... *G09G 3/3241* (2013.01); *G09G 2300/0426* (2013.01); *G09G 2300/0819* (2013.01);
(Continued)

(58) Field of Classification Search
CPC ......... G09G 3/3241; G09G 2300/0426; G09G 2300/0819; G09G 2300/0852;
(Continued)

(56) References Cited

U.S. PATENT DOCUMENTS

2011/0157126 A1 6/2011 Chung et al.
2014/0071112 A1 3/2014 Han
(Continued)

FOREIGN PATENT DOCUMENTS

CN 102842283 A 12/2012
CN 102890910 A 1/2013
(Continued)

*Primary Examiner* — Mark Edwards
(74) *Attorney, Agent, or Firm* — BROOKS KUSHMAN P.C.

(57) ABSTRACT

A pixel driving circuit is used for driving a light emitting element, in the pixel driving circuit, a first terminal of the driving sub-circuit being coupled to a power supply line; a compensation sub-circuit is respectively coupled to a scanning line, a control terminal of the driving sub-circuit, and a second terminal of the driving sub-circuit; a first terminal of the coupling sub-circuit being coupled to the control terminal of the driving sub-circuit; a first terminal of the storage sub-circuit being coupled to a second terminal of the coupling sub-circuit; a data writing-in sub-circuit is respectively coupled to a second terminal of the storage sub-circuit, a data line, and a reset line; a first reset sub-circuit is respectively coupled to the reset line, an initialization signal line, the control terminal of the driving sub-circuit, and the second terminal of the coupling sub-circuit.

18 Claims, 25 Drawing Sheets

(52) U.S. Cl.
CPC ............... *G09G 2300/0852* (2013.01); *G09G 2300/0861* (2013.01); *G09G 2310/0297* (2013.01); *G09G 2310/06* (2013.01); *G09G 2320/0209* (2013.01); *G09G 2320/0693* (2013.01)

(58) Field of Classification Search
CPC ... G09G 2300/0861; G09G 2310/0297; G09G 2310/06; G09G 2320/0209; G09G 2320/0693
USPC .......................................................... 345/206
See application file for complete search history.

(56) References Cited

U.S. PATENT DOCUMENTS

| | | | | |
|---|---|---|---|---|
| 2014/0333515 | A1 | 11/2014 | In et al. | |
| 2015/0029239 | A1 | 1/2015 | Park | |
| 2017/0365647 | A1* | 12/2017 | Choi .................... | G09G 3/3258 |
| 2021/0174743 | A1* | 6/2021 | Chang .................. | G09G 3/3291 |
| 2021/0335989 | A1 | 10/2021 | Diao et al. | |

FOREIGN PATENT DOCUMENTS

| | | | |
|---|---|---|---|
| CN | 113053281 | A | 6/2021 |
| CN | 214477457 | U | 10/2021 |
| CN | 113853643 | A | 12/2021 |
| JP | 2007206590 | A | 8/2007 |

* cited by examiner

PIXEL DRIVING CIRCUIT, DISPLAY PANEL AND DISPLAY DEVICE

CROSS-REFERENCE TO RELATED APPLICATION

This application is the U.S. National Phase of PCT Application No. PCT/CN2022/085538 filed on Apr. 7, 2022, which is incorporated herein by reference in its entirety.

TECHNICAL FIELD

The present disclosure relates to the field of display technology, in particular to a pixel driving circuit, a display panel and a display device.

BACKGROUND

Organic light emitting diode displays not only have good flexibility, but also have the advantages of thinness, low power consumption, fast response speed, wide viewing angle, etc., and are widely used in various fields. Moreover, with the development of display technology, there is an increasing demand for high frame rate and high resolution display panels in the market, and organic light emitting diode displays are gradually developing towards high frame rate and high resolution.

SUMMARY

The present disclosure aims to provide a pixel driving circuit, a display substrate and a display device.

In one aspect, the present disclosure provides in some embodiments a pixel driving circuit for driving a light emitting element, wherein the pixel driving circuit includes: a driving sub-circuit, a first terminal of the driving sub-circuit being coupled to a power supply line; a compensation sub-circuit, respectively coupled to a scanning line, a control terminal of the driving sub-circuit, and a second terminal of the driving sub-circuit; configured to control to connect or disconnect the control terminal and the second terminal of the driving sub-circuit under the control of the scanning line; a coupling sub-circuit, a first terminal of the coupling sub-circuit being coupled to the control terminal of the driving sub-circuit; a storage sub-circuit, a first terminal of the storage sub-circuit being coupled to a second terminal of the coupling sub-circuit; a data writing-in sub-circuit, respectively coupled to a second terminal of the storage sub-circuit, a data line, and a reset line; configured to control to connect or disconnect the second terminal of the storage sub-circuit and the data line under the control of the reset line; a first reset sub-circuit, respectively coupled to the reset line, an initialization signal line, the control terminal of the driving sub-circuit, and the second terminal of the coupling sub-circuit; configured to, under the control of the reset line, control to connect or disconnect the initialization signal line and the control terminal of the driving sub-circuit and control to connect or disconnect the initialization signal line and the second terminal of the coupling sub-circuit; a first maintenance sub-circuit, respectively coupled to the scanning line, the second terminal of the coupling sub-circuit, and the initialization signal line; configured to control to connect or disconnect the second terminal of the coupling sub-circuit and the initialization signal line under the control of the scanning line; and a second maintenance sub-circuit, respectively coupled to the a first control line, a reference signal line and the second terminal of the storage sub-circuit; configured to control to connect or disconnect the reference signal line and the second terminal of the storage sub-circuit under the control of the first control line.

Optionally, the pixel driving circuit further includes: a light emitting control sub-circuit, respectively coupled to the second terminal of the driving sub-circuit, the light emitting element and a second control line; configured to control to connect or disconnect the second terminal of the driving sub-circuit and the light emitting element under the control of the second control line.

Optionally, the pixel driving circuit further includes: a second reset sub-circuit, respectively coupled to the scanning line, the light emitting element and the initialization signal line; and configured to control to connect or disconnect the light emitting element and the initialization signal line under the control of the scanning line.

Optionally, the coupling sub-circuit includes a first capacitor, the storage sub-circuit includes a second capacitor, the data writing-in sub-circuit includes a first transistor, the compensation sub-circuit includes a second transistor, the driving sub-circuit includes a third transistor, the first reset sub-circuit includes a fourth transistor and a fifth transistor, the second reset sub-circuit includes a sixth transistor, the first maintenance sub-circuit includes a seventh transistor, the light emitting control sub-circuit includes an eighth transistor, and the second maintenance sub-circuit includes a ninth transistor; a gate electrode of the first transistor is coupled to the reset line, a first electrode of the first transistor is coupled to the data line, and a second electrode of the first transistor is coupled to a second terminal of the second capacitor; a gate electrode of the second transistor is coupled to the scanning line, a first electrode of the second transistor is coupled to a second electrode of the third transistor, and a second electrode of the second transistor is coupled to a gate electrode of the third transistor; a first electrode of the third transistor is coupled to the power supply line; a first terminal of the first capacitor is coupled to the gate electrode of the third transistor, and a first terminal of the second capacitor is coupled to a second terminal of the first capacitor; a gate electrode of the fourth transistor is coupled to the reset line, a first electrode of the fourth transistor is coupled to the initialization signal line, and a second electrode of the fourth transistor is coupled to the gate electrode of the third transistor; a gate electrode of the fifth transistor is coupled to the reset line, a first electrode of the fifth transistor is coupled to the initialization signal line, and a second electrode of the fifth transistor is coupled to the second terminal of the first capacitor; a gate electrode of the sixth transistor is coupled to the scanning line, a first electrode of the sixth transistor is coupled to the initialization signal line, and a second electrode of the sixth transistor is coupled to the light emitting element; a gate electrode of the seventh transistor is coupled to the scanning line, a first electrode of the seventh transistor is coupled to the initialization signal line, a second electrode of the seventh transistor is coupled to the second terminal of the first capacitor; a gate electrode of the eighth transistor is coupled to the second control line, a first electrode of the eighth transistor is coupled to the second electrode of the third transistor, and a second electrode of the eighth transistor is coupled to the light emitting element; a gate electrode of the ninth transistor is coupled to the first control line, a first electrode of the ninth transistor is coupled to the reference signal line, and a second electrode of the ninth transistor is coupled to the second terminal of the second capacitor.

In a second aspect, an embodiment of the present disclosure provides a display substrate, including a plurality of pixel driving circuits, the pixel driving circuit includes a first capacitor and a third transistor, and the first capacitor includes a first electrode plate and a second electrode plate oppositely arranged, and the first electrode plate is multiplexed as a gate electrode of the third transistor; the display substrate includes: a plurality of data lines, wherein the data line includes at least a portion extending along the first direction, an orthographic projection of the data line on a base substrate of the display substrate and an orthographic projection of the first electrode plate on the base substrate are arranged along a second direction, the first direction intersects the second direction; a plurality of first shielding patterns, wherein at least part of an orthographic projection of the first shielding pattern on the base substrate is located between the orthographic projection of the data line on the base substrate and the orthographic projection of the first electrode plate on the base substrate; and/or at least part of the orthographic projection of the first shielding pattern on the base substrate is located between the orthographic projection of the data line on the base substrate and an orthographic projection of the second electrode plate on the base substrate.

Optionally, the pixel driving circuit further comprises a second capacitor, the second capacitor includes a third electrode plate and a fourth electrode plate oppositely arranged, the third electrode plate is coupled to the second electrode plate; the third electrode plate and the second electrode plate are arranged along the first direction; at least part of the orthographic projection of the first shielding pattern on the base substrate is located between the orthographic projection of the data line on the base substrate and an orthographic projection of the third electrode plate on the base substrate and/or, at least part of the orthographic projection of the first shielding pattern on the base substrate is located between the orthographic projection of the data line on the base substrate and an orthographic projection of the fourth electrode plate on the base substrate.

Optionally, the first shielding pattern comprises a first shielding portion and a second shielding portion coupled to each other, the first shielding portion and the second shielding portion are arranged along the second direction, and at least part of the orthographic projection of the data line on the base substrate is located between an orthographic projection of the first shielding portion on the base substrate and an orthographic projection of the second shielding portion on the base substrate; at least part of the orthographic projection of the first shielding portion on the base substrate is located between an orthographic projection of at least one of a first capacitor and a second capacitor adjacent to the first shielding portion on the base substrate and the orthographic projection of the data line on the base substrate; and/or, at least part of the orthographic projection of the second shielding portion on the base substrate is located between an orthographic projection of at least one of a first capacitor and a second capacitor adjacent to the second shielding portion on the base substrate and the orthographic projection of the data line on the base substrate.

Optionally, the display substrate further comprises a second conductive connection portion and the data line; the pixel driving circuit further includes a first transistor, a first electrode of the first transistor is coupled to a corresponding data line, and a second electrode of the first transistor is coupled to the fourth electrode plate through a corresponding second conductive connection portion; the second conductive connection portion is located between adjacent first shielding patterns along the second direction.

Optionally, the display substrate further comprises a third conductive connection portion and a fifth conductive connection portion; the pixel driving circuit further includes a second transistor and a third transistor, a second electrode of the second transistor is coupled to a gate electrode of the third transistor through the third conductive connection portion, a second electrode of the fifth transistor is coupled to the second electrode plate through the fifth conductive connection portion; the third conductive connection portion is located between adjacent first shielding patterns along the second direction, and the fifth conductive connection portion is located between adjacent first shielding patterns along the second direction.

Optionally, the display substrate further comprises: a plurality of shielding lines each including at least a portion extending along the second direction; the plurality of pixel driving circuits are divided into a plurality of rows of pixel driving circuits, and an orthographic projection of the shielding line on the base substrate at least partially overlaps an orthographic projections of an edge of each first electrode plate in a corresponding row of pixel driving circuits close to the fourth electrode plate on the base substrate.

Optionally, the plurality of first shielding patterns are divided into a plurality of rows of first shielding patterns, and the shielding line is respectively coupled to a corresponding row of first shielding patterns.

Optionally, the display substrate includes a power supply line, and the first shielding pattern is coupled to the power supply line.

Optionally, the first shielding pattern and the shielding line are arranged on a same layer as the third conductive connection portion.

Optionally, the display substrate further includes a reset line, and the shielding line and the reset line are arranged along the first direction; the third conductive connection portion and the fifth conductive connection portion are located between the shielding line and the reset line.

Optionally, the display substrate further includes: a plurality of second shielding patterns, wherein the second shielding pattern includes at least a portion extending along the first direction, an orthographic projection of the second shielding pattern on the base substrate at least partially overlaps the orthographic projection of the data line on the base substrate.

Optionally, the display substrate further comprises a plurality of second control lines; second shielding patterns located in a same row along the second direction are respectively coupled to a corresponding second control line.

Optionally, the second shielding patterns located in the same row along the second direction and the corresponding second control line form an integral structure.

Optionally, the display substrate further comprises a power supply line and an initialization signal line, and the second shield pattern is coupled to the power supply line or the initialization signal line.

Optionally, the display substrate further includes: a plurality of initialization signal lines arranged along the first direction, the initialization signal line including at least a portion extending along the second direction; a plurality of initial connection lines arranged along the second direction, the initial connection line including at least a portion extending along the first direction, each initial connection line being respectively coupled to the plurality of initialization signal lines.

Optionally, the display substrate further includes: a plurality of reference signal lines arranged in the first direction, the reference signal line including at least a portion extending along the second direction; a plurality of reference connection lines arranged along the second direction, the reference connection line including at least a portion extending along the first direction, each reference connection line is respectively connected to the plurality of reference signal lines.

Optionally, the initial connection lines and the reference connection lines are arranged alternately along the second direction; the plurality of pixel driving circuits are divided into a plurality of columns of pixel driving circuits, each column of pixel driving circuits correspond to one initial connection line or correspond to one reference connection line; an orthographic projection of the initial connection line on the base substrate at least partially overlaps an orthographic projection of the second electrode plate in the corresponding column of pixel driving circuits on the base substrate; and/or, an orthographic projection of the reference connection line on the base substrate at least partially overlaps the orthographic projection of the second electrode plate in the corresponding column of pixel driving circuits on the base substrate.

Optionally, the display substrate further comprises a plurality of reset lines, and the reset line includes at least a portion extending along the second direction, and the reset lines and the third conductive connection portion are arranged on a same layer.

Optionally, the pixel driving circuit includes a second transistor, a fourth transistor, a fifth transistor and a seventh transistor, the second transistor, the fourth transistor, the fifth transistor and the seventh transistor adopt a double-gate structure.

In a third aspect, an embodiment of the present disclosure provides a display device, including the display substrate.

BRIEF DESCRIPTION OF THE DRAWINGS

The drawings described here are used to provide a further understanding of the present disclosure, and constitute a part of the present disclosure. The schematic embodiments of the present disclosure and their descriptions are used to explain the present disclosure, and do not constitute improper limitations to the present disclosure.

DETAILED DESCRIPTION

In order to further illustrate the pixel driving circuit, the display substrate and the display device provided by the embodiments of the present disclosure, a detailed description will be given below in conjunction with the accompanying drawings.

With the improvement of the resolution and frame frequency of the display products, the scanning line period becomes shorter, which restricts the detection and compensation accuracy of the threshold voltage detection of the pixel driving circuit in the display products.

Figure 1:
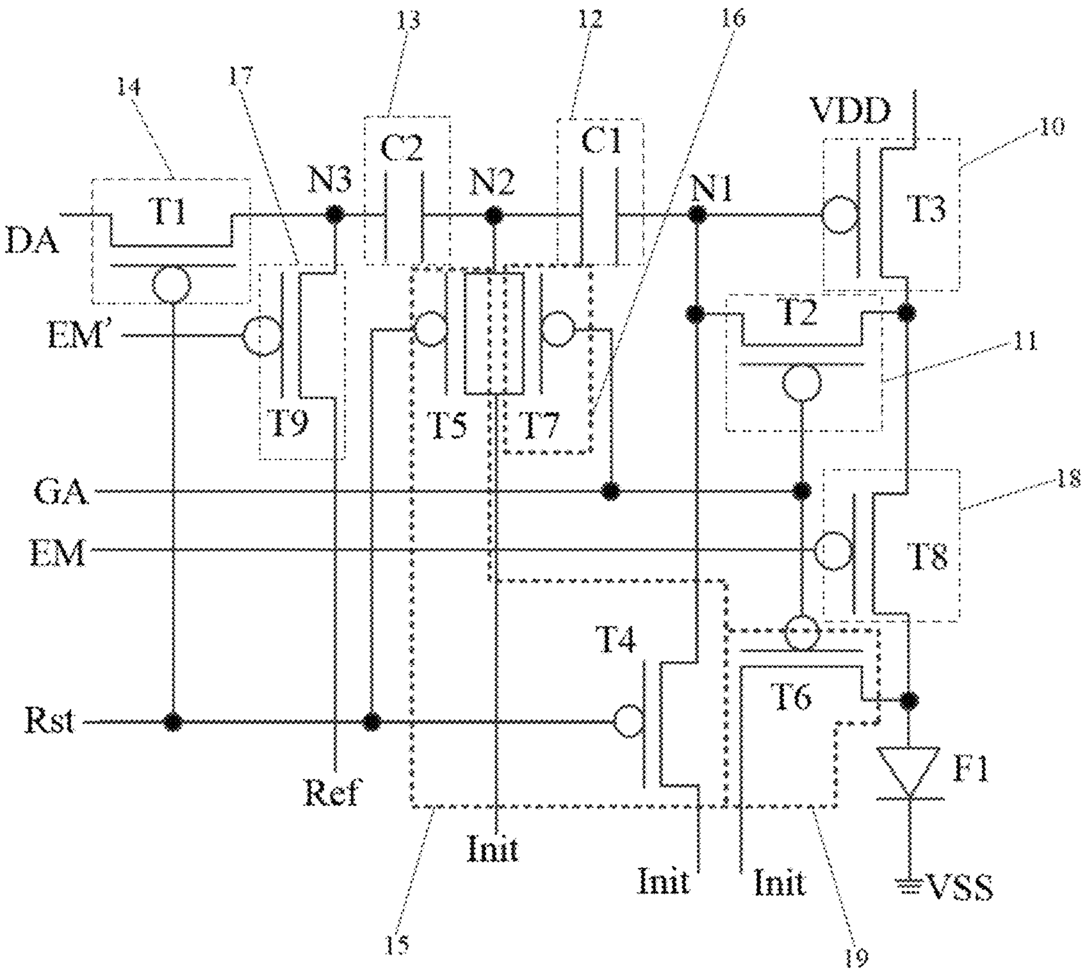
FIG. 1 is a circuit structural diagram of a pixel driving circuit provided by an embodiment of the present disclosure.
Figure 2:
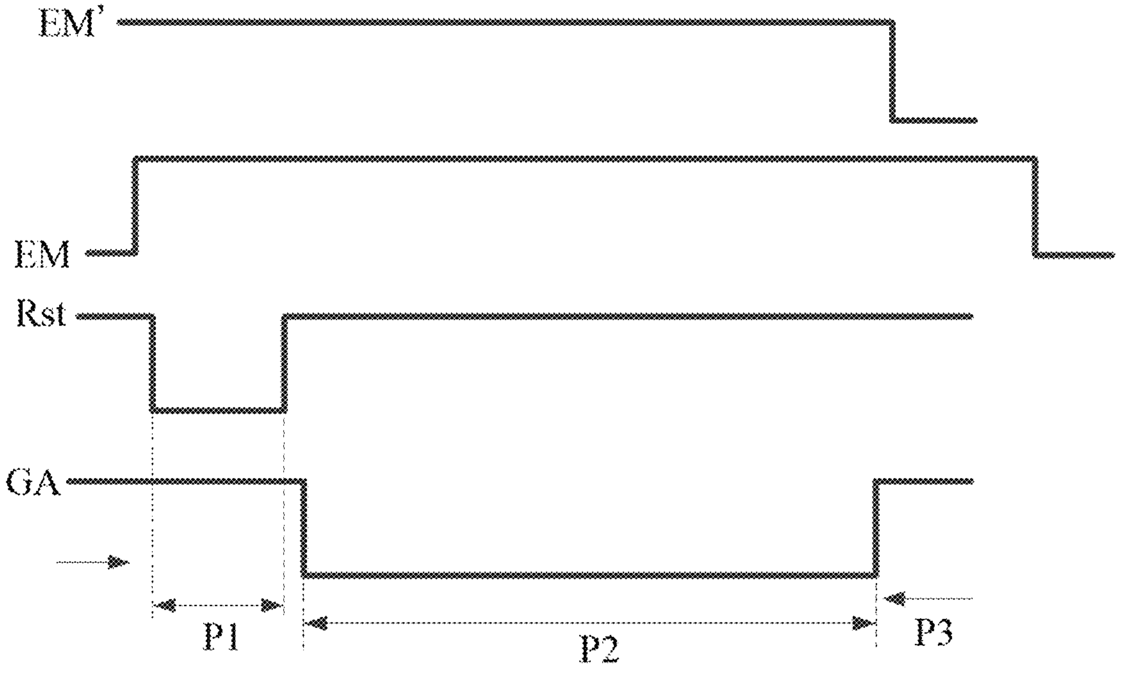
FIG. 2 is a driving timing diagram of a pixel driving circuit provided by an embodiment of the present disclosure.

As shown in FIG. 1 and FIG. 2, an embodiment of the present disclosure provides a pixel driving circuit for driving a light emitting element, and the pixel driving circuit includes:

a driving sub-circuit 10, a first terminal of the driving sub-circuit 10 being coupled to a power supply line VDD;

a compensation sub-circuit 11, respectively coupled to a scanning line GA, a control terminal of the driving sub-circuit 10, and a second terminal of the driving sub-circuit 10;

configured to control to connect or disconnect the control terminal and the second terminal of the driving sub-circuit 10 under the control of the scanning line GA;

a coupling sub-circuit 12, a first terminal of the coupling sub-circuit 12 being coupled to the control terminal of the driving sub-circuit 10;

a storage sub-circuit 13, a first terminal of the storage sub-circuit 13 being coupled to a second terminal of the coupling sub-circuit 12;

a data writing-in sub-circuit 14, respectively coupled to a second terminal of the storage sub-circuit 13, a data line DA, and a reset line Rst; configured to control to connect or disconnect the second terminal of the storage sub-circuit 13 and the data line DA under the control of the reset line Rst;

a first reset sub-circuit 15, respectively coupled to the reset line Rst, an initialization signal line Init, the control terminal of the driving sub-circuit 10, and the second terminal of the coupling sub-circuit 12; configured to, under the control of the reset line Rst, control to connect or disconnect the initialization signal line Init and the control terminal of the driving sub-circuit 10 and control to connect or disconnect the initialization signal line Init and the second terminal of the coupling sub-circuit 12;

a first maintenance sub-circuit 16, respectively coupled to the scanning line GA, the second terminal of the coupling sub-circuit 12, and the initialization signal line Init; configured to control to connect or disconnect the second terminal of the coupling sub-circuit 12 and the initialization signal line Init under the control of the scanning line GA;

a second maintenance sub-circuit 17, respectively coupled to the a first control line EM', a reference signal line Ref and the second terminal of the storage sub-circuit 13; configured to control to connect or disconnect the reference signal line Ref and the second terminal of the storage sub-circuit 13 under the control of the first control line EM'.

As shown in FIG. 1 and FIG. 2, in some embodiments, the pixel driving circuit further includes:

a light emitting control sub-circuit 18, respectively coupled to the second terminal of the driving sub-circuit 10, a light emitting element F1 and a second control line EM; configured to control to connect or disconnect the second terminal of the driving sub-circuit 10 and the light emitting element under the control of the second control line EM. The cathode of the light emitting element F1 is coupled to the negative power supply line VSS.

As shown in FIG. 1 and FIG. 2, in some embodiments, the pixel driving circuit further includes:

a second reset sub-circuit 19, respectively coupled to the scanning line GA, the light emitting element and the initialization signal line Init; and configured to control to connect or disconnect the light emitting element and the initialization signal line Init under the control of the scanning line GA.

A working period of the pixel driving circuit includes: a reset writing-in phase P1, a threshold voltage detection phase P2 and a light emitting phase P3.

In the reset writing-in phase P1: the reset signal written by the reset line Rst is at an active level (for example, a low level), and under the action of the reset signal, the first reset sub-circuit 15 controls to connect the initialization signal line Init and the control terminal (defined as N1 node) of the driving sub-circuit 10, controls to connect the initialization signal line Init and the second terminal of the coupling sub-circuit 12 (defined as N2 nodes), to realize the reset of the control terminal of the driving sub-circuit 10 and the reset of the second terminal of the coupling sub-circuit 12. Under the action of the reset signal, the data writing-in sub-circuit 14 controls to connect the second terminal (defined as N3 node) of the storage sub-circuit 13 and the data line DA, and writes the data signal provided by the data line DA into the second terminal of the storage sub-circuit 13. In the reset writing-in phase P1, the potential of the N1 node is Vinit, the potential of the N2 node is Vinit, and the potential of the N3 node is Vdt. Vinit is the voltage value of the initial signal transmitted by the initialization signal line Init. Vdt is the voltage value of the data signal.

In the threshold voltage detection phase P2: the scanning signal written by the scanning line GA is at an active level (for example, a low level), and under the action of the scanning signal, the compensation sub-circuit 11 controls to connect the control terminal and the second terminal of the driving sub-circuit 10, the first maintenance sub-circuit 16 controls to connect the second terminal of the coupling sub-circuit 12 and the initialization signal line Init, the second reset sub-circuit 19 controls to connect the light emitting element and the initialization signal line Init. In the threshold voltage detection phase P2, the potential of the N1 node is Vdd-|Vth|, the potential of the N2 node is Vinit, and the potential of the N3 node is Vdt. Vdd is the voltage value of the power signal transmitted by the power supply line VDD. Vth is the threshold voltage of the driving transistor included in the driving sub-circuit 10.

In the light emitting phase P3: the first light emitting control signal written by the first control line EM' is at an active level (for example, a low level), and under the action of the first light emitting control signal, the second maintenance sub-circuit 17 controls to connect the reference signal line Ref and the second terminal of the storage sub-circuit 13; the second light emitting control signal written by the second control line EM is at an active level (for example, a low level), under the action of the second light emitting control signal, the light emitting control sub-circuit 18 controls to connect the second terminal of the driving sub-circuit 10 and the light emitting element. In the light emitting phase P3, the potential of the N1 node is Vdd-|Vth|+Vref-Vdt, the potential of the N2 node is Vinit+Vref-Vdt, and the potential of the N3 node is Vref. Vref is the voltage value of the reference signal transmitted by the reference signal line Ref.

In the light emitting phase P3, the driving circuit for driving the light emitting element to emit light is:

I=k (Vgs-Vth) 2, k is a constant, and Vgs is the gate-source voltage of the driving transistor included in the driving sub-circuit 10.

$$\text{Finally get: } I = k(Vref - Vdt)^2.$$

According to the specific structure of the above-mentioned pixel driving circuit, in the pixel driving circuit provided by the embodiment of the present disclosure, the data signal is written in the reset writing-in phase P1, and this process is the refreshing process of the data signal. The detection of the threshold voltage is realized in the threshold voltage detection phase P2. Therefore, the pixel driving circuit provided by the embodiments of the present disclosure separates the refresh process of the data signal and the threshold voltage detection process into two independent processes, so that the threshold voltage detection process is not limited by the row scan period, and an ideal charging rate for the storage sub-circuit 13 and detection accuracy of the threshold voltage can be obtained by extending the time of the detection process, which can ensure sufficient detection time of the threshold voltage while satisfying a high refresh rate (that is, a high frame rate).

In the pixel driving circuit provided by the embodiments of the present disclosure, by controlling the refresh process to a shorter time, it is beneficial for display products applied to the pixel driving circuit to achieve high resolution and high frame rate.

In the pixel driving circuit provided by the embodiments of the present disclosure, the driving current of the light emitting element is only related to the reference signal and the data signal, and the influence of the threshold voltage on the driving current is avoided.

Figure 4:
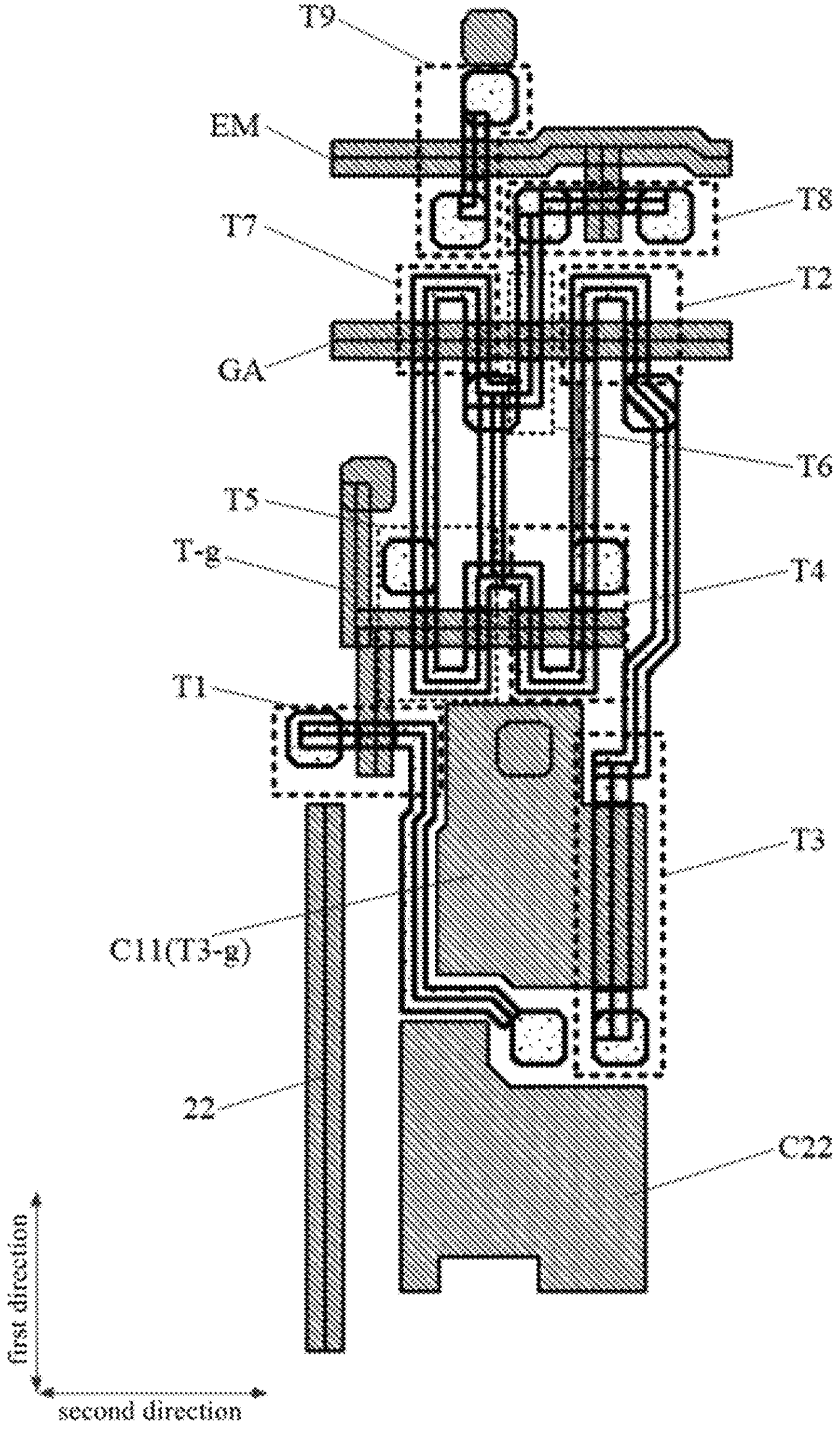
FIG. 4 is a schematic layout diagram of the active layer and the first conductive layer in FIG. 3.

Referring to FIG. 1, FIG. 2 and FIG. 4, in some embodiments, the coupling sub-circuit 12 includes a first capacitor C1, the storage sub-circuit 13 includes a second capacitor C2, and the data writing-in sub-circuit 14 includes a first transistor T1, the compensation sub-circuit 11 includes a second transistor T2, the driving sub-circuit 10 includes a third transistor T3, the first reset sub-circuit 15 includes a fourth transistor T4 and a fifth transistor T5, the second reset sub-circuit 19 includes a sixth transistor T6, the first maintenance sub-circuit 16 includes a seventh transistor T7, the light emitting control sub-circuit 18 includes an eighth transistor T8, and the second maintenance sub-circuit 17 includes a ninth transistor T9;

The gate electrode of the first transistor T1 is coupled to the reset line Rst, the first electrode of the first transistor T1 is coupled to the data line DA, and the second electrode of the first transistor T1 is coupled to the second terminal of the second capacitor C2;

The gate electrode of the second transistor T2 is coupled to the scanning line GA, the first electrode of the second transistor T2 is coupled to the second electrode of the third transistor T3, and the second electrode of the second transistor T2 is coupled to the gate electrode T3-*g* of the third transistor T3;

The first electrode of the third transistor T3 is coupled to the power supply line VDD;

The first terminal of the first capacitor C1 is coupled to the gate electrode T3-*g* of the third transistor T3, and the first terminal of the second capacitor C2 is coupled to the second terminal of the first capacitor C1;

The gate electrode of the fourth transistor T4 is coupled to the reset line Rst, the first electrode of the fourth transistor T4 is coupled to the initialization signal line Init, and the second electrode of the fourth transistor T4 is coupled to the gate electrode T3-*g* of the third transistor T3;

The gate electrode of the fifth transistor T5 is coupled to the reset line Rst, the first electrode of the fifth transistor T5 is coupled to the initialization signal line Init, and the second electrode of the fifth transistor T5 is coupled to the second terminal of the first capacitor C1;

The gate electrode of the sixth transistor T6 is coupled to the scanning line GA, the first electrode of the sixth transistor T6 is coupled to the initialization signal line Init, and the second electrode of the sixth transistor T6 is coupled to the light emitting element;

The gate electrode of the seventh transistor T7 is coupled to the scanning line GA, the first electrode of the seventh transistor T7 is coupled to the initialization signal line Init, the second electrode of the seventh transistor T7 is coupled to the second terminal of the first capacitor C1;

The gate electrode of the eighth transistor T8 is coupled to the second control line EM, the first electrode of the eighth transistor T8 is coupled to the second electrode of the third transistor T3, and the second electrode of the eighth transistor T8 is coupled to the light emitting element;

The gate electrode of the ninth transistor T9 is coupled to the first control line EM', the first electrode of the ninth transistor T9 is coupled to the reference signal line Ref, and the second electrode of the ninth transistor T9 is coupled to the second terminal of the second capacitor C2.

Exemplarily, the first transistor T1 to the ninth transistor T9 are all P-type transistors, but not limited thereto.

In the reset writing-in phase P1: the reset signal written by the reset line Rst is at an active level (for example, a low level), and under the action of the reset signal, the fourth transistor T4 controls to connect the initialization signal line Init and the gate electrode T3-*g* (defined as N1 node) of the third transistor T3, and the fifth transistor T5 controls to connect the initialization signal line Init and the second terminal of the first capacitor C1 (defined as N2 node), to realize the reset of the gate electrode T3-*g* of the third transistor T3 and the reset of the second terminal of the first capacitor C1. Under the action of the reset signal, the first transistor T1 controls to connect the second terminal of the second capacitor C2 (defined as node N3) and the data line DA, and writes the data signal provided by data line DA into the second terminal of the second capacitor C2. In the reset writing-in phase P1, the potential of the N1 node is Vinit, the potential of the N2 node is Vinit, and the potential of the N3 node is Vdt.

In the threshold voltage detection phase P2: the scanning signal written by the scanning line GA is at an active level (for example, a low level), and under the action of the scanning signal, the second transistor T2 controls to connect the gate electrode T3-*g* and the second electrode of the third transistor T3, the seventh transistor T7 controls to connect the second terminal of the first capacitor C1 and the initialization signal line Init, the sixth transistor T6 controls to connect the light emitting element and the initialization signal line Init. In the threshold voltage detecting phase P2, the potential of the N1 node is Vdd-|Vth|, the potential of the N2 node is Vinit, and the potential of the N3 node is Vdt.

In the light emitting phase P3: the first light emitting control signal written by the first control line EM' is at an active level (for example, a low level), and under the action of the first light emitting control signal, the ninth transistor T9 controls to connect the reference signal line Ref and the second terminal of the storage sub-circuit 13; the second light emitting control signal written by the second control line EM is at an active level (for example, a low level), under the action of the second light emitting control signal, the eighth transistor T8 controls to connect the second electrode of the third transistor T3 and the light emitting element. In the light emitting phase P3, the potential of the N1 node is Vdd-|Vth|+Vref-Vdt, the potential of the N2 node is Vinit+Vref-Vdt, and the potential of the N3 node is Vref. In the light emitting phase P3, the driving circuit for driving the light emitting element to emit light is: $I=k\ (Vgs-Vth)^2$, and finally to obtain: $I=k\ (Vref-Vdt)^2$.

In the pixel driving circuit provided by the above embodiments, the data signal is written in the reset writing-in phase P1, and this process is the refreshing process of the data signal. The detection of the threshold voltage is realized in the threshold voltage detection phase P2. Therefore, the pixel driving circuit provided by the above-mentioned embodiment separates the refresh process of the data signal and the detection process of the threshold voltage into two independent processes, so that the detection process of the threshold voltage is not limited by the row scan period, and the ideal charging rate for the storage sub-circuit 13 and threshold voltage detection accuracy can be obtained by extending the time of the detection process, and the sufficient threshold voltage detection time can be guaranteed while satisfying a high refresh rate (that is, a high frame rate).

In the pixel driving circuit provided by the above embodiments, by controlling the refresh process to a shorter time, it is beneficial for the display products applied to the pixel driving circuit to achieve high resolution and high frame rate.

In the pixel driving circuit provided by the above embodiments, the driving current of the light emitting element is only related to the reference signal and the data signal, and the influence of the threshold voltage on the driving current is avoided.

As shown in FIG. 3 to FIG. 10 and FIG. 16, an embodiment of the present disclosure also provides a display substrate, including a plurality of pixel driving circuits provided in the above embodiment; the pixel driving circuit includes a first capacitor C1 and a third transistor T3, the first capacitor C1 includes a first electrode plate C11 and a second electrode plate C12 oppositely arranged, and the first electrode plate C11 is multiplexed as the gate electrode T3-*g* of the third transistor T3;

The display substrate includes:

A plurality of data lines DA, the data line DA includes at least a portion extending along the first direction, an orthographic projection of the data line DA on a base substrate of the display substrate, and an orthographic projection of the first electrode plate C11 on the base substrate are arranged along a second direction, the first direction intersecting the second direction;

A plurality of first shielding patterns 20, at least part of an orthographic projection of the first shielding pattern 20 on the base substrate is located between the orthographic projection of the data line DA on the base substrate, and the orthographic projection of the first electrode plate C11 on the base substrate.

As shown in FIG. 11 to FIG. 20, for example, the display substrate includes a plurality of sub-pixels, and the plurality of pixel driving circuits 50 included in the plurality of sub-pixels are arranged in an array. The plurality of pixel driving circuits 50 are divided into a plurality of rows of pixel driving circuits and a plurality of columns of pixel driving circuits. The plurality of rows of pixel driving circuits are arranged along the first direction, and each row of pixel driving circuits include a plurality of pixel driving circuits arranged along the second direction. The plurality of columns of pixel driving circuits are arranged along the second direction, and each column of pixel driving circuits includes a plurality of pixel driving circuits arranged along the first direction. Exemplarily, the first direction intersects the second direction. For example: the first direction includes the longitudinal direction, and the second direction includes the horizontal direction.

Exemplarily, the sub-pixel includes a pixel driving circuit and a light emitting element. The pixel driving circuit is coupled to the anode of the light emitting element, and is used to provide a driving signal for the light emitting element to drive the light emitting element to emit light.

Figure 11:
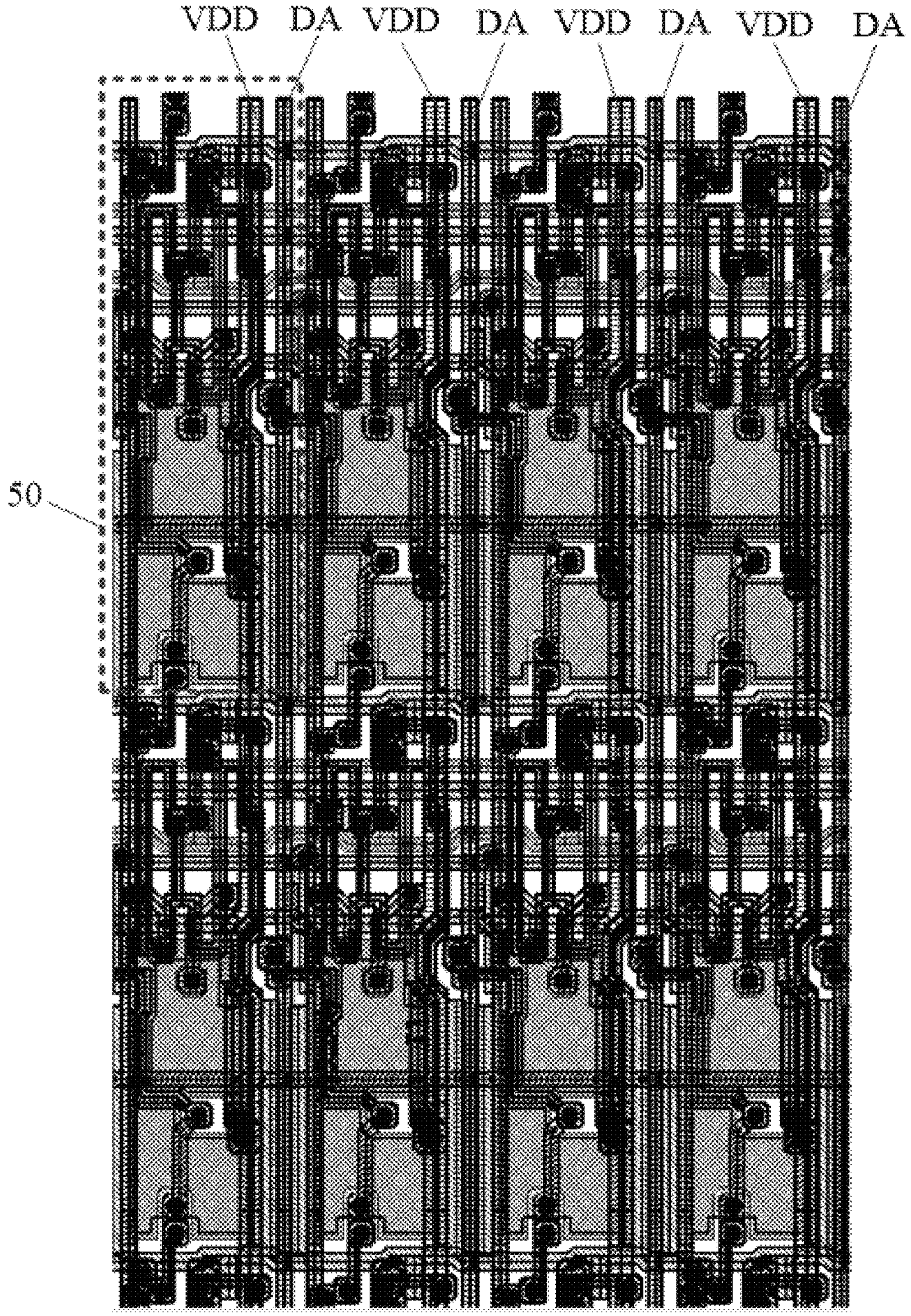
FIG. 11 is a schematic layout diagram of 2 rows and 4 columns of pixel driving circuits provided by an embodiment of the present disclosure.
Figure 12:
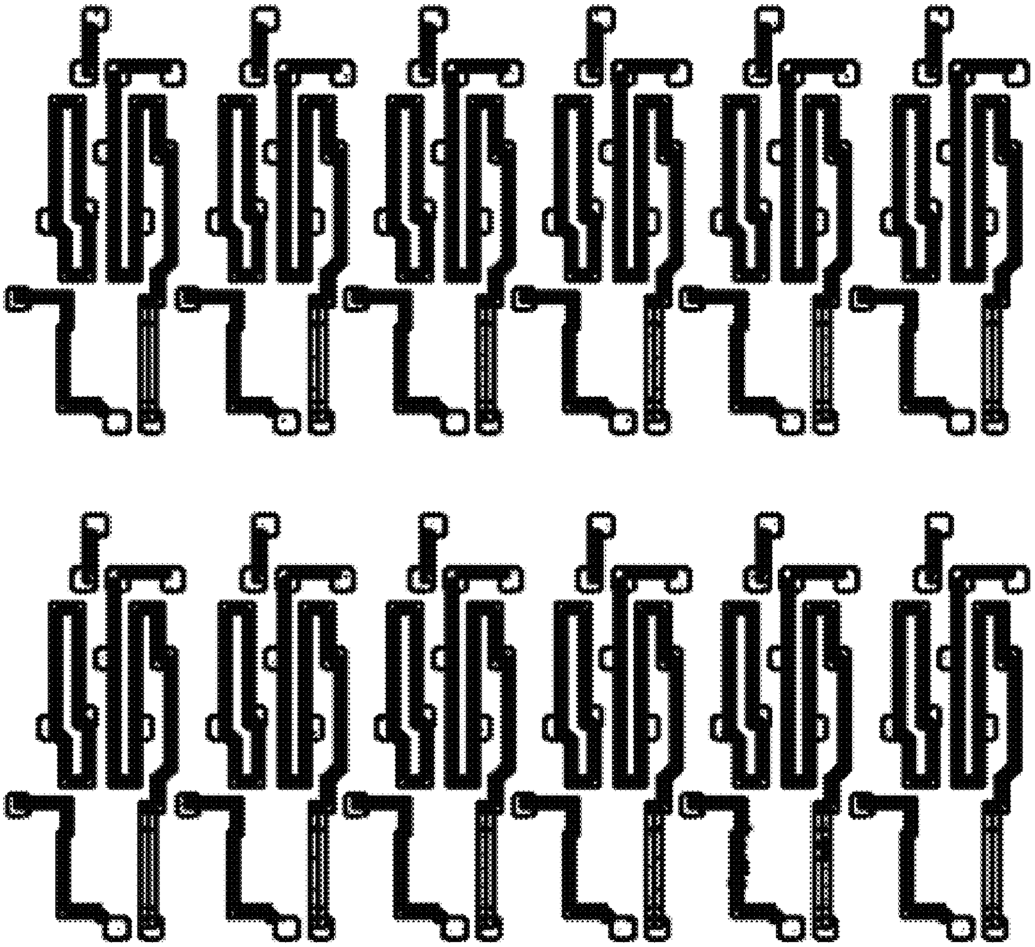
FIG. 12 is a schematic layout diagram of an active layer in 2 rows and 6 columns of pixel driving circuits provided by an embodiment of the present disclosure.
Figure 13:
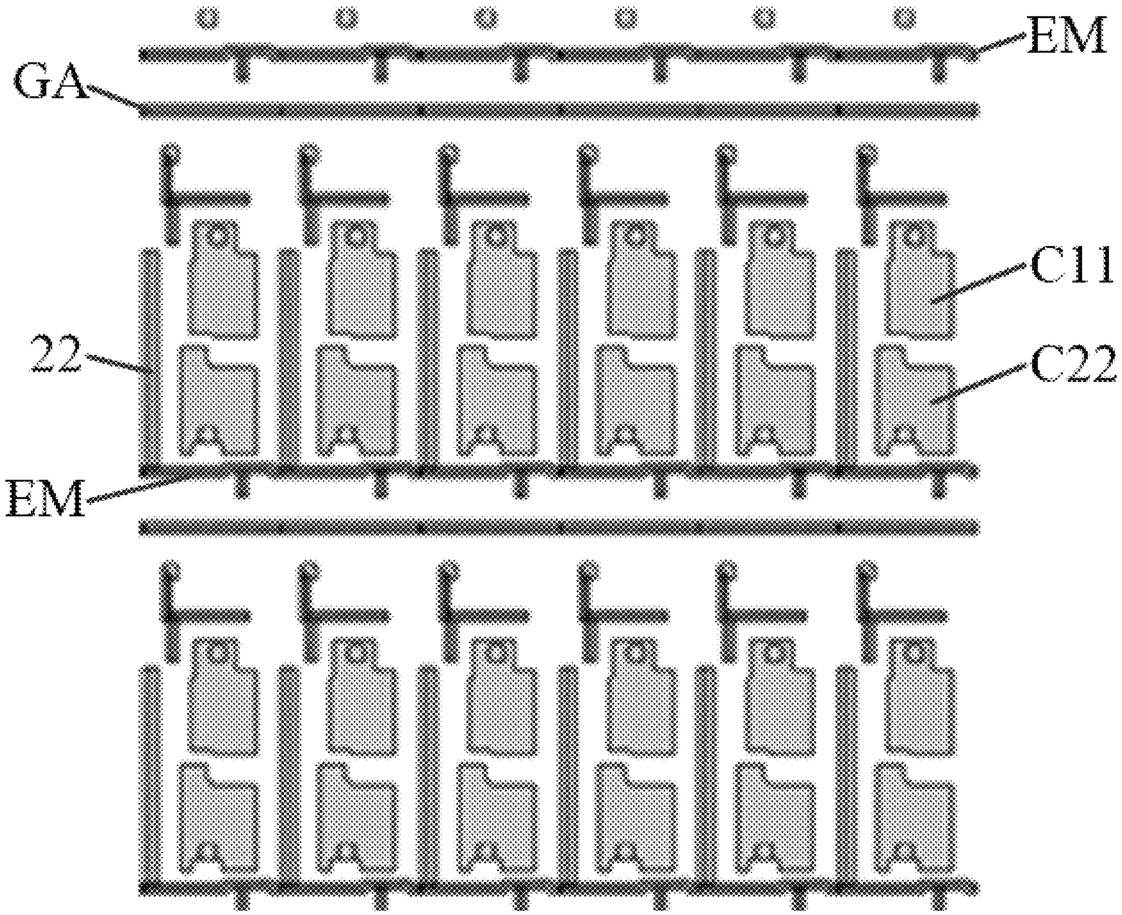
FIG. 13 is a schematic layout diagram of the first conductive layer in 2 rows and 6 columns of pixel driving circuits provided by an embodiment of the present disclosure.
Figure 14:
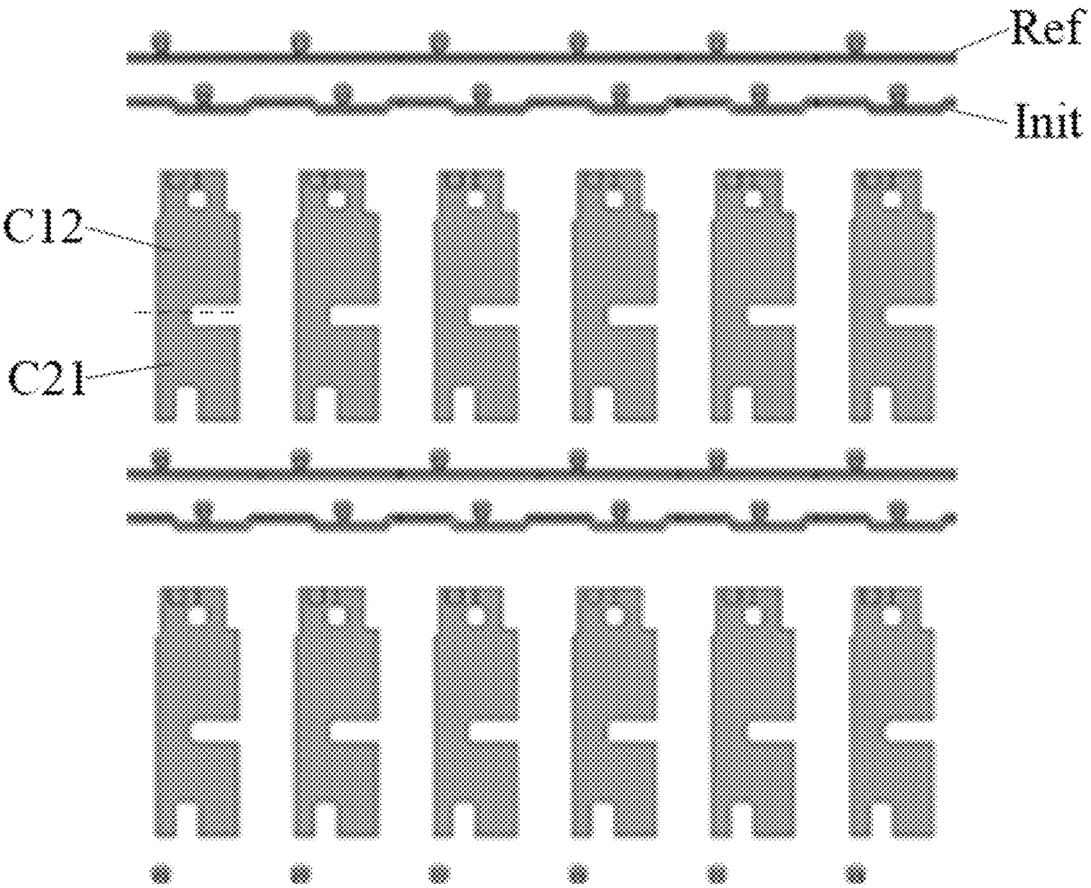
FIG. 14 is a schematic layout diagram of the second conductive layer in 2 rows and 6 columns of pixel driving circuits provided by an embodiment of the present disclosure.
Figure 15:
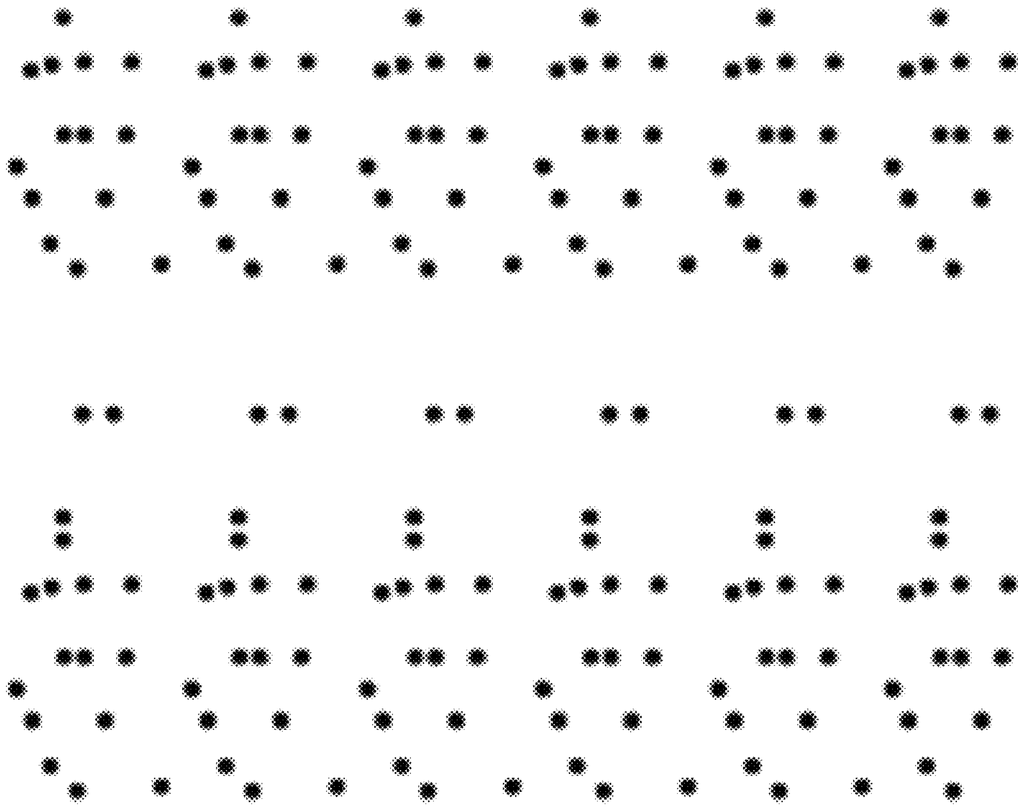
FIG. 15 is a schematic diagram of the positions of via holes formed on the interlayer insulating layer in 2 rows and 6 columns of pixel driving circuits provided by an embodiment of the present disclosure.
Figure 17:
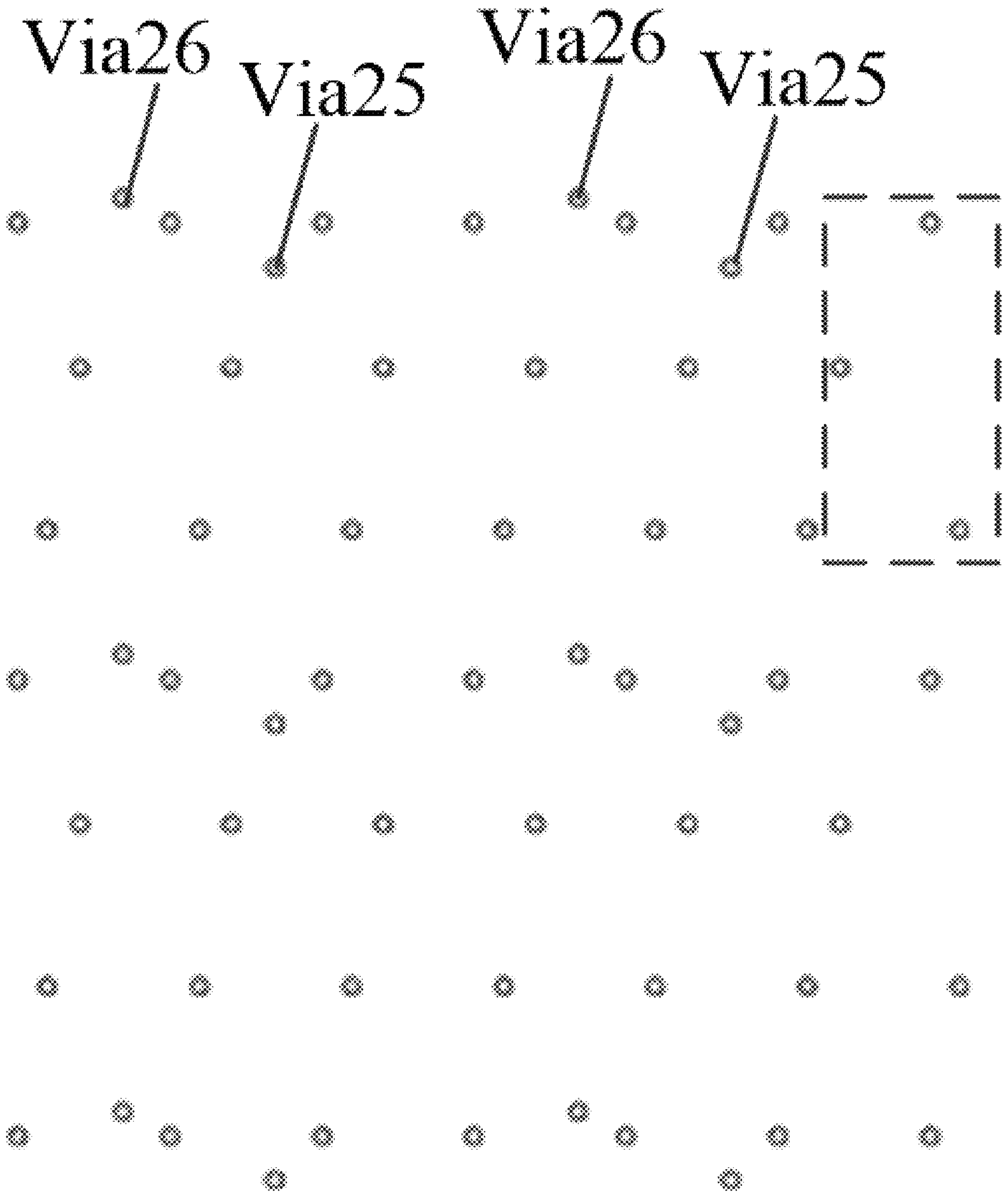
FIG. 17 is a schematic diagram of the positions of via holes formed on the first planarization layer in 2 rows and 6 columns of pixel driving circuits provided by an embodiment of the present disclosure.
Figure 20:
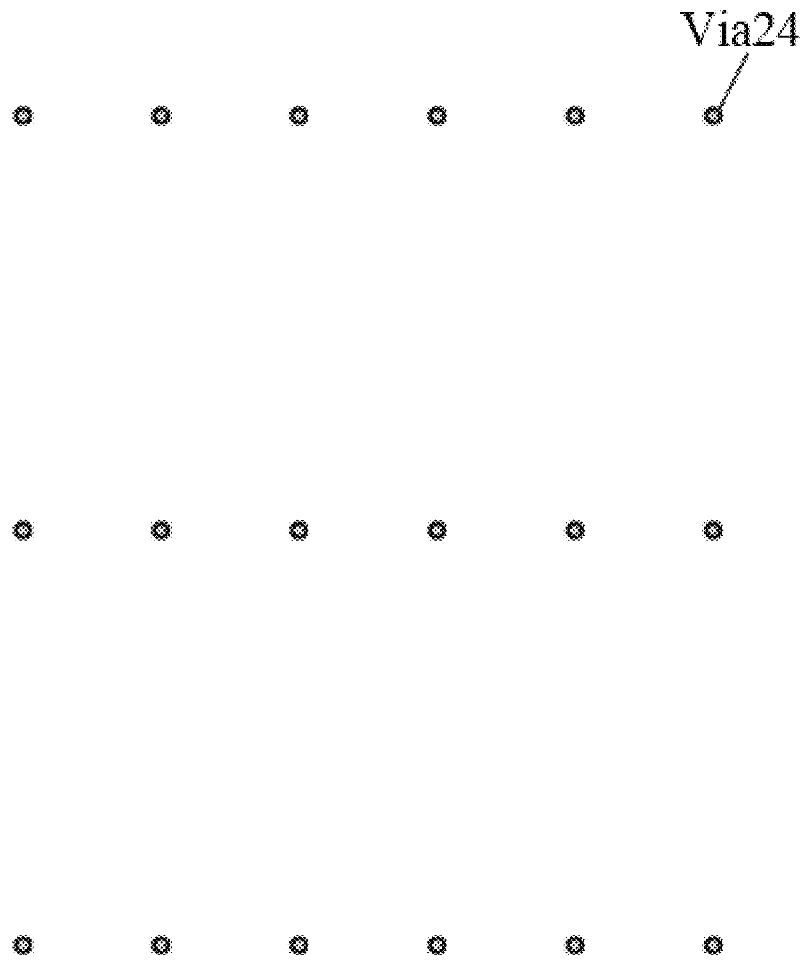
FIG. 20 is a schematic diagram of the positions of via holes formed on the second planarization layer in 2 rows and 6 columns of pixel driving circuits provided by an embodiment of the present disclosure.

FIG. 15 is a schematic diagram of the position of the via hole formed on the interlayer insulating layer in FIG. 11; FIG. 17 is a schematic diagram of the position of the via hole formed on the first planarization layer in FIG. 11; FIG. 20 is a schematic diagram of the position of the via holes formed on the second planarization layer in FIG. 11.

Exemplarily, the third transistor T3 is used as a driving transistor in the pixel driving circuit. The first electrode plate C11 is multiplexed as the gate electrode T3-*g* of the third transistor T3, as the N1 node.

Exemplarily, an orthographic projection of the first electrode plate C11 on the base substrate at least partially overlaps an orthographic projection of the second electrode plate C12 on the base substrate.

Exemplarily, the plurality of data lines DA are arranged along the second direction. The plurality of data lines DA are in one-to-one correspondence with the plurality of columns of pixel driving circuits, and the data lines DA are respectively electrically connected to the first electrodes of the first transistors T1 in the corresponding column of pixel driving circuits, and used for providing data signal.

Exemplarily, the plurality of first shielding patterns 20 correspond to the plurality of data lines DA in a one-to-one manner, and at least part of the orthographic projection of the first shielding pattern 20 on the base substrate is located between the orthographic projection of data line DA on the base substrate and the orthographic projection of the first electrode plate C11 adjacent to the data line DA on the base substrate.

Figure 21:
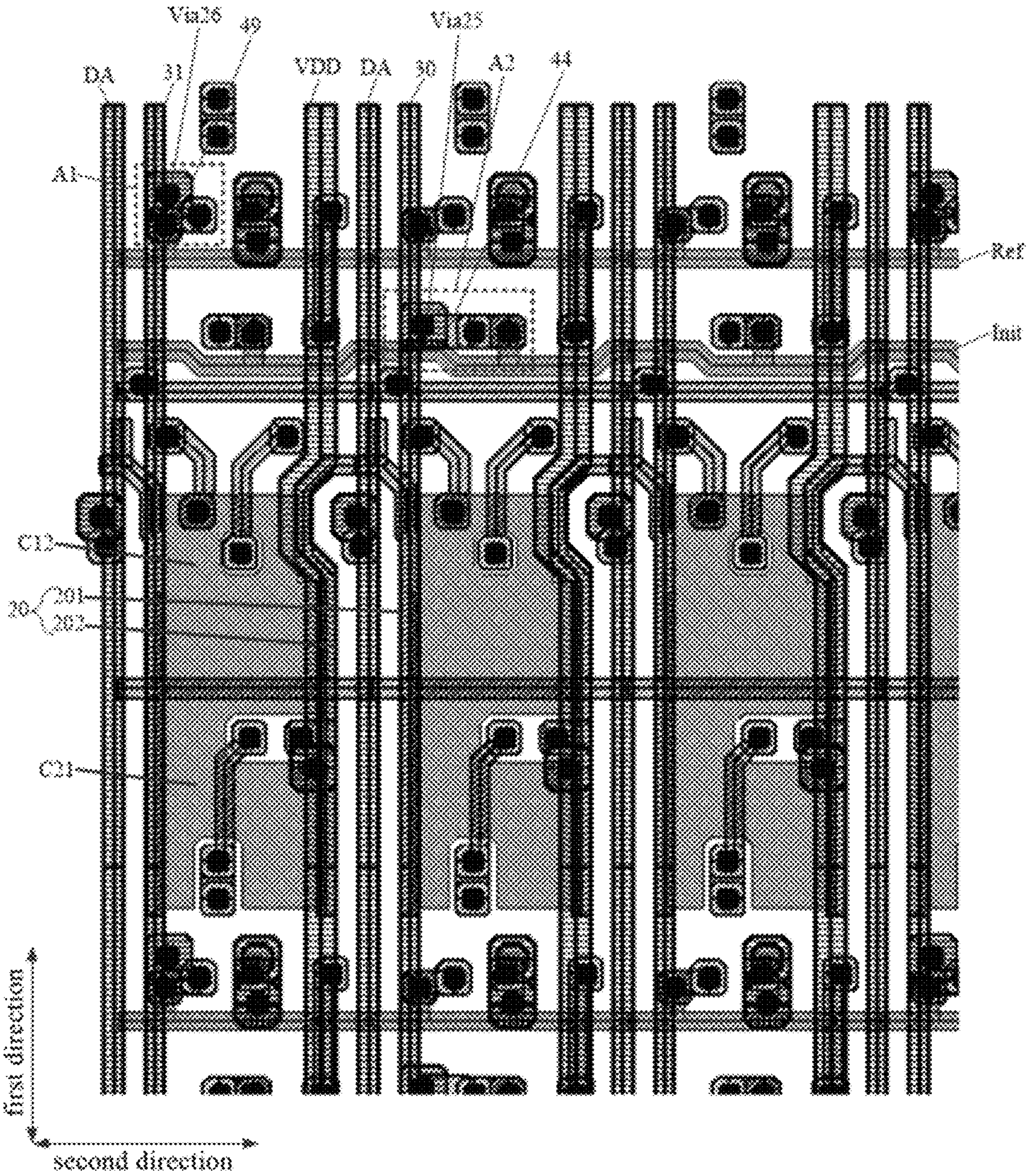
FIG. 21 shows the second conductive layer, the third conductive layer, and the fourth conductive layer in the 1 row and 3 columns of pixel driving circuits provided by the embodiment of the present disclosure.
Figure 22:
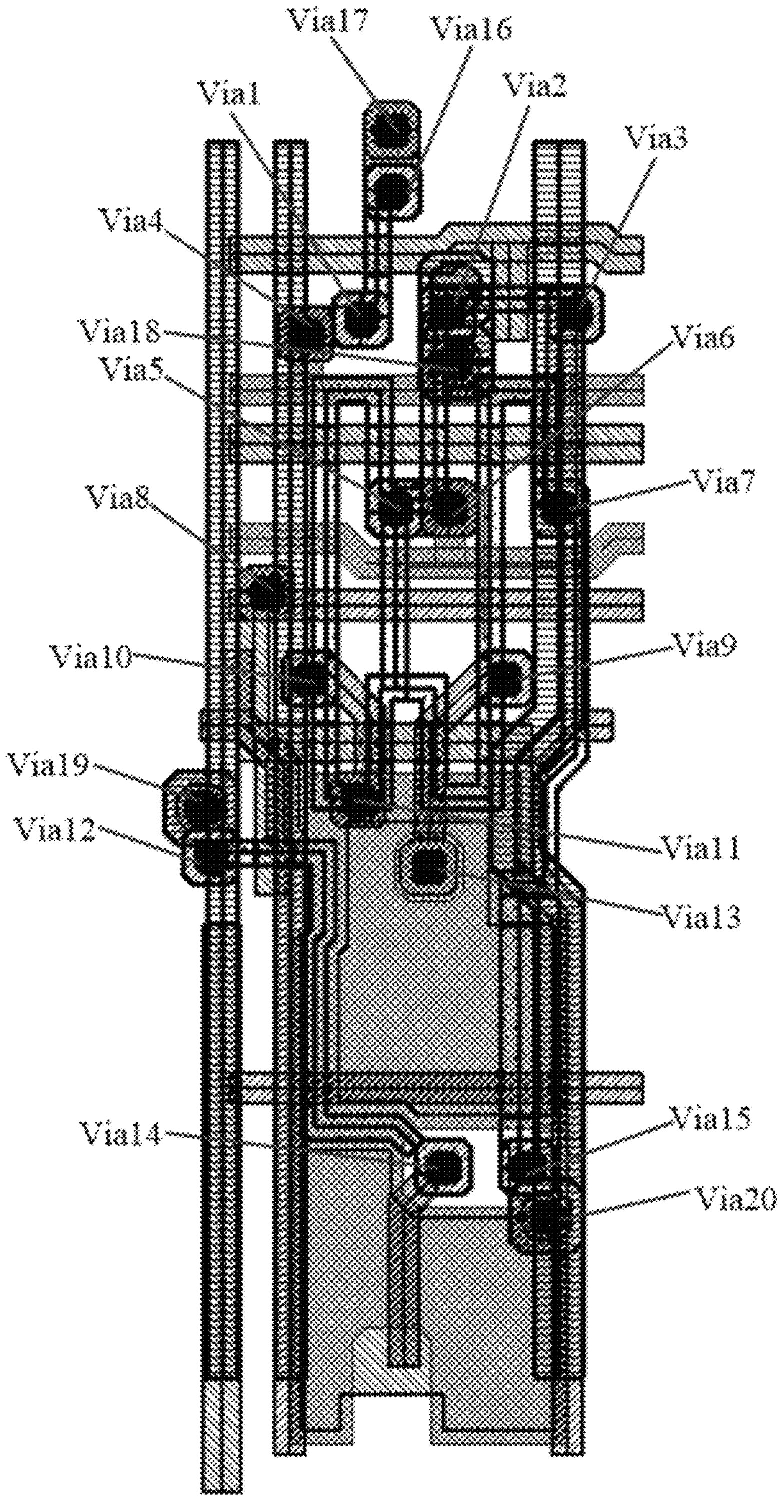
FIG. 22 is a schematic diagram of a layout of via holes in a pixel driving circuit provided by an embodiment of the present disclosure.

As shown in FIG. 21, for example, along the second direction, adjacent first shielding patterns 20 are separated by at least one sub-pixel. Along the second direction, there is a first shield pattern 20 between two adjacent second electrode plates C12 or two adjacent third electrode plates C21.

According to the specific structure of the above-mentioned display substrate, in the display substrate provided by the embodiment of the present disclosure, at least part of the orthographic projection of the first shielding pattern 20 on the base substrate is located between the orthographic projection of the data line DA on the base substrate and the orthographic projection of the first electrode plate C11 on the base substrate, and/or, at least part of the orthographic projection of the first shielding pattern on the base substrate is located between the orthographic projection of the data line on the base substrate and the orthographic projection of the second electrode plate on the base substrate, so that the first shielding pattern 20 can shield the influence between the data line DA and the N1 node, reducing the crosstalk between the data line DA and the N1 node.

As shown in FIG. 3 to FIG. 10, FIG. 16 and FIG. 21, in some embodiments, at least part of the orthographic projection of the first shielding pattern 20 on the base substrate is located between the orthographic projection of the data line DA on the base substrate and the orthographic projection of the second electrode plate C12 on the base substrate.

Exemplarily, the orthographic projection of the first shielding pattern 20 on the base substrate partially overlaps the orthographic projection of the second electrode plate C12 on the base substrate.

Exemplarily, the first transistor T1 includes a first active layer, an orthographic projection of the first shielding pattern 20 on the base substrate partially overlaps an orthographic projection the first active layer on the base substrate.

Exemplarily, the first active layer forms the first channel portion included in the first transistor T1, the orthographic projection of the first shield pattern 20 on the base substrate partially overlaps the orthographic projection of the first channel portion on the base substrate.

Exemplarily, the orthographic projection of the first shielding pattern 20 on the base substrate partly overlaps the orthographic projection of the gate electrode of the first transistor T1 on the base substrate.

The second electrode plate C12 is the N2 node, at least part of the orthographic projection of the first shielding pattern 20 on the base substrate is located between the orthographic projection of the data line DA on the base substrate and the orthographic projection of the second electrode plate C12 on the base substrate, so that the first shielding pattern 20 can shield the influence between the data line DA and the N2 node, and reduce the crosstalk between the data line DA and the N2 node.

As shown in FIG. 3 to FIG. 10 and FIG. 16, in some embodiments, the pixel driving circuit further includes a second capacitor C2, and the second capacitor C2 includes a third electrode plate C21 and a fourth electrode plate C22 oppositely arranged, the third electrode plate C21 is coupled to the second electrode plate C12;

The third electrode plate C21 and the second electrode plate C12 are arranged along the first direction;

At least part of the orthographic projection of the first shielding pattern 20 on the base substrate is located between the orthographic projection of the data line DA on the base substrate, and the orthographic projection of the third electrode plate C21 on the base substrate and/or, at least part of the orthographic projection of the first shielding pattern 20 on the base substrate is located between the orthographic projection of the data line DA on the base substrate and the orthographic projection of the fourth electrode plate C22 on the base substrate.

Exemplarily, the orthographic projection of the third electrode plate C21 on the base substrate at least partially overlaps the orthographic projection of the fourth electrode plate C22 on the base substrate.

Exemplarily, the third electrode plate C21 and the second electrode plate C12 form an integral structure. The second electrode plate C12 and the third electrode plate C21 serve as the N2 node.

Exemplarily, the fourth electrode plate C22 and the first electrode plate C11 are arranged in the same layer and made of the same material. The fourth electrode plate C22 and the first electrode plate C11 are arranged along the first direction.

Exemplarily, the orthographic projection of the first shielding pattern 20 on the base substrate partially overlaps the orthographic projection of the third electrode plate C21 on the base substrate. The orthographic projection of the first shielding pattern 20 on the base substrate partially overlaps the orthographic projection of the fourth electrode plate C22 on the base substrate.

At least part of the orthographic projection of the first shielding pattern 20 on the base substrate is located between the orthographic projection of the data line DA on the base substrate, and the orthographic projection of the third electrode plate C21 on the base substrate, so that the first shielding pattern 20 can shield the influence between the data line DA and the N2 node, and reduce the crosstalk between the data line DA and the N2 node.

The fourth electrode plate C22 is the N3 node, at least part of the orthographic projection of the first shielding pattern 20 on the base substrate is located between the orthographic projection of the data line DA on the base substrate and the orthographic projection of the fourth electrode plate C22 on the base substrate, so that the first shielding pattern 20 can shield the influence between the data line DA and the N3 node, and reduce the crosstalk between the data line DA and the N3 node.

As shown in FIGS. 3 to 10, FIG. 16 and FIG. 21, in some embodiments, the first shielding pattern 20 includes a first shielding portion 201 and a second shielding portion 202 coupled to each other, the first shielding portion 201 and the second shielding portion 202 are arranged along the second direction, and at least part of the orthographic projection of the data line DA on the base substrate is located between the orthographic projection of the first shielding portion 201 on the base substrate and the orthographic projection of the second shielding portion 202 on the base substrate;

At least part of the orthographic projection of the first shielding portion 201 on the base substrate is located between the orthographic projection of at least one of the first capacitor C1 and the second capacitor C2 adjacent to the first shielding portion 201 on the base substrate and the orthographic projection of the data line DA on the base substrate; and/or, at least part of the orthographic projection of the second shielding portion 202 on the base substrate is located between the orthographic projection of at least one of the first capacitor C1 and the second capacitor C2 adjacent to the second shielding portion 202 on the base substrate, and an orthographic projection of the data line DA on the base substrate.

It should be noted that the first capacitor C1 and the second capacitor C2 adjacent to the first shielding portion 201 refer to: the first capacitor C1 and the second capacitor C2 closest to the first shielding portion 201 along the second direction. The first capacitor C1 and the second capacitor C2 adjacent to the second shielding portion 202 refer to: the first capacitor C1 and the second capacitor C1 closest to the second shielding portion 202 along the second direction.

Exemplarily, the first shielding portion 201 and the second shielding portion 202 form an integral structure.

Exemplarily, the first shielding portion 201 and the second shielding portion 202 are jointly formed into an n-type structure. The orthographic projection of the first shielding pattern 20 on the base substrate at least partially overlaps the orthographic projection of the data line DA on the base substrate.

Exemplarily, at least part of the orthographic projection of the first shielding portion 201 on the base substrate is located between the orthographic projection of at least one of the first electrode plate C11, the second electrode plate C12, the third electrode plate C21 and the fourth electrode plate C22 adjacent to the first shielding portion 201 on the base substrate and the orthographic projection of the data line DA on the base substrate.

Exemplarily, at least part of the orthographic projection of the second shielding portion 202 on the base substrate is located between the orthographic projection of at least one of the first electrode plate C11, the second electrode plate C12, the third electrode plate C21 and the fourth electrode plate C22 adjacent to the second shielding portion 202 on the base substrate and the orthographic projection of the data line DA on the base substrate.

In the display substrate provided by the above embodiment, the distance between the data line DA and adjacent nodes N1, N2, and N3 can be enlarged.

In the display substrate provided by the above embodiments, the first shielding pattern 20 includes the first shielding portion 201 and the second shielding portion 202, so that the first shielding portion 201 and the second shielding portion 202 can shield the crosstalk between the data line DA and the N1 node, N2 node, and N3 node at left and right sides of the data line DA.

As shown in FIG. 3, FIG. 4, FIG. 6 and FIG. 16, in some embodiments, the display substrate further includes a second conductive connection portion 42 and a data line DA; the pixel driving circuit further includes a first transistor T1, the first electrode of the first transistor T1 is coupled to the corresponding data line DA, and the second electrode of the first transistor T1 is coupled to the fourth electrode plate C22 through the corresponding second conductive connection portion 42; the second conductive connection portion 42 is located between the adjacent first shielding patterns 20 along the second direction.

The above setting is beneficial to shield the crosstalk between the data line DA and the node N3.

As shown in FIG. 3, FIG. 4, FIG. 6 and FIG. 16, in some embodiments, the display substrate further includes a third conductive connection portion 43 and a fifth conductive connection portion 45; the pixel driving circuit further includes a second transistor T2 and a third transistor T3, the second electrode of the second transistor T2 is coupled to the gate electrode of the third transistor T3 through the third conductive connection portion 43, the second electrode of the fifth transistor T5 is coupled to the second electrode plate C12 through the fifth conductive connection portion 45; the third conductive connection portion 43 is located between the first shielding patterns 20 adjacent along the second direction, and the fifth conductive connection portion 45 is located between first shielding patterns 20 adjacent along the second direction.

The above arrangement is beneficial to shield the crosstalk of the data line DA to the third conductive connection portion 43 and the fifth conductive connection portion 45.

As shown in FIG. 3 to FIG. 10 and FIG. 16, in some embodiments, the display substrate further includes:

a plurality of shielding lines 21 each including at least a portion extending along the second direction;

The plurality of pixel driving circuits are divided into a plurality of rows of pixel driving circuits, and the orthographic projection of the shielding line 21 on the base substrate at least partially overlaps an orthographic projections of an edge of each first electrode plate C11 in the corresponding row of pixel driving circuits close to the fourth electrode plate C22 on the base substrate.

Exemplarily, the plurality of shielding lines 21 are arranged along the first direction. The plurality of shielding lines 21 are in one-to-one correspondence with the plurality of rows of pixel driving circuits.

Exemplarily, the orthographic projection of the shielding line 21 on the base substrate at least at least partially overlaps an orthographic projections of an edge of each second electrode plate C12 in the corresponding row of pixel driving circuits close to the third electrode plate C21 on the base substrate.

The above arrangement effectively shields the crosstalk between the first capacitor C1 and the second capacitor C2.

Figure 3:
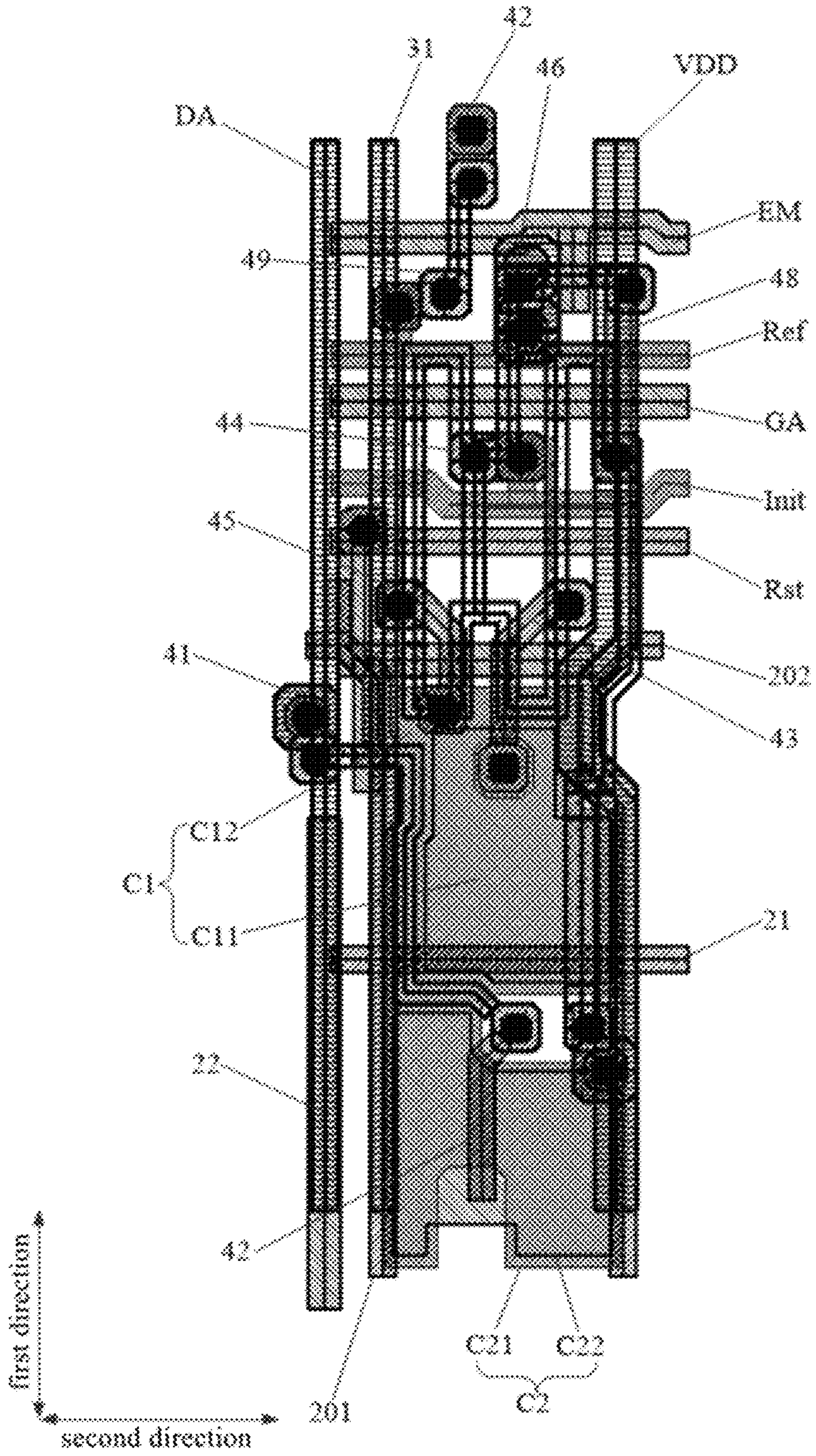
FIG. 3 is a schematic layout diagram of a pixel driving circuit provided by an embodiment of the present disclosure.
Figure 6:
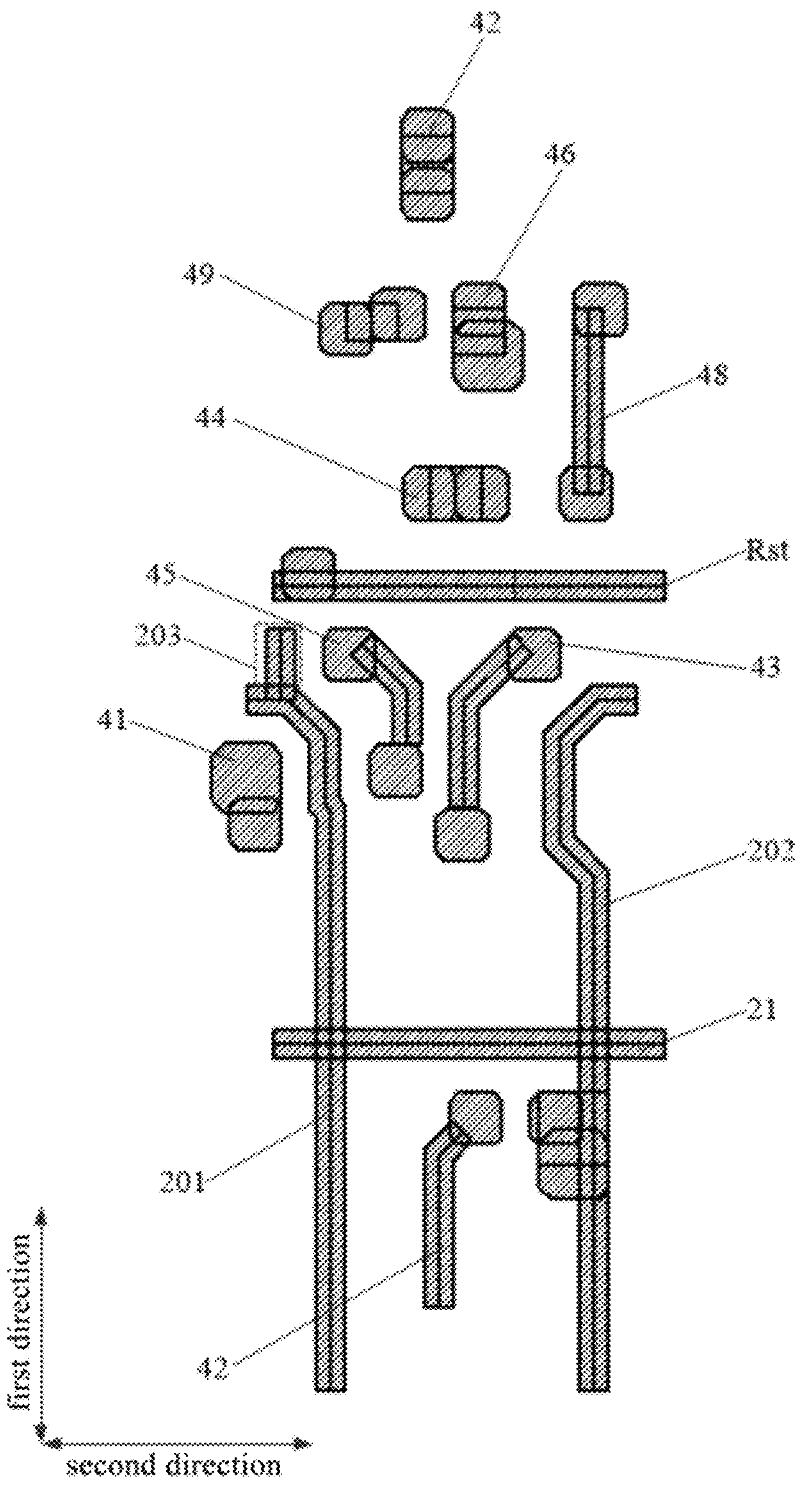
FIG. 6 is a schematic layout diagram of the third conductive layer in FIG. 3.
Figure 7:
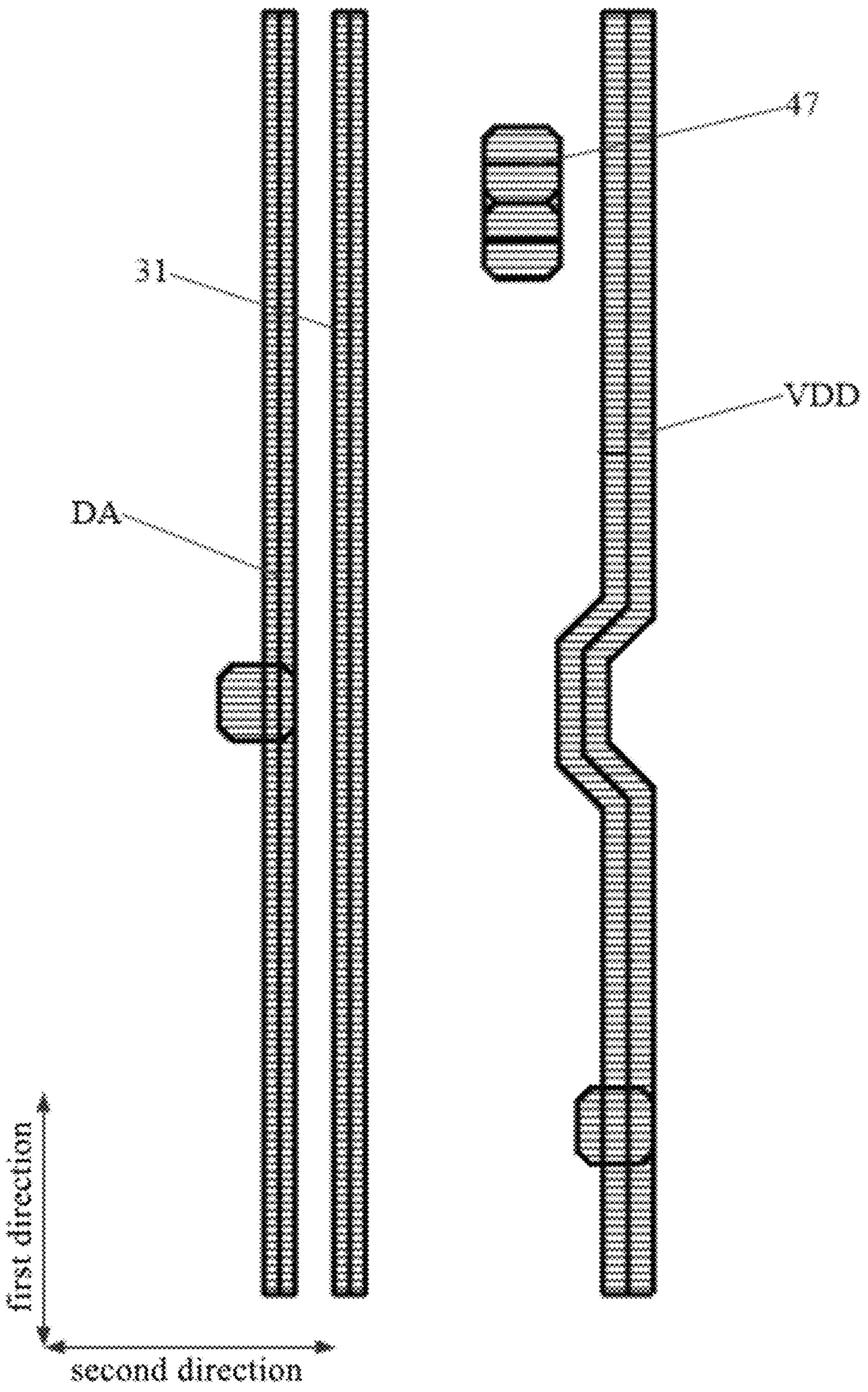
FIG. 7 is a schematic layout diagram of the fourth conductive layer in FIG. 3.
Figure 8:
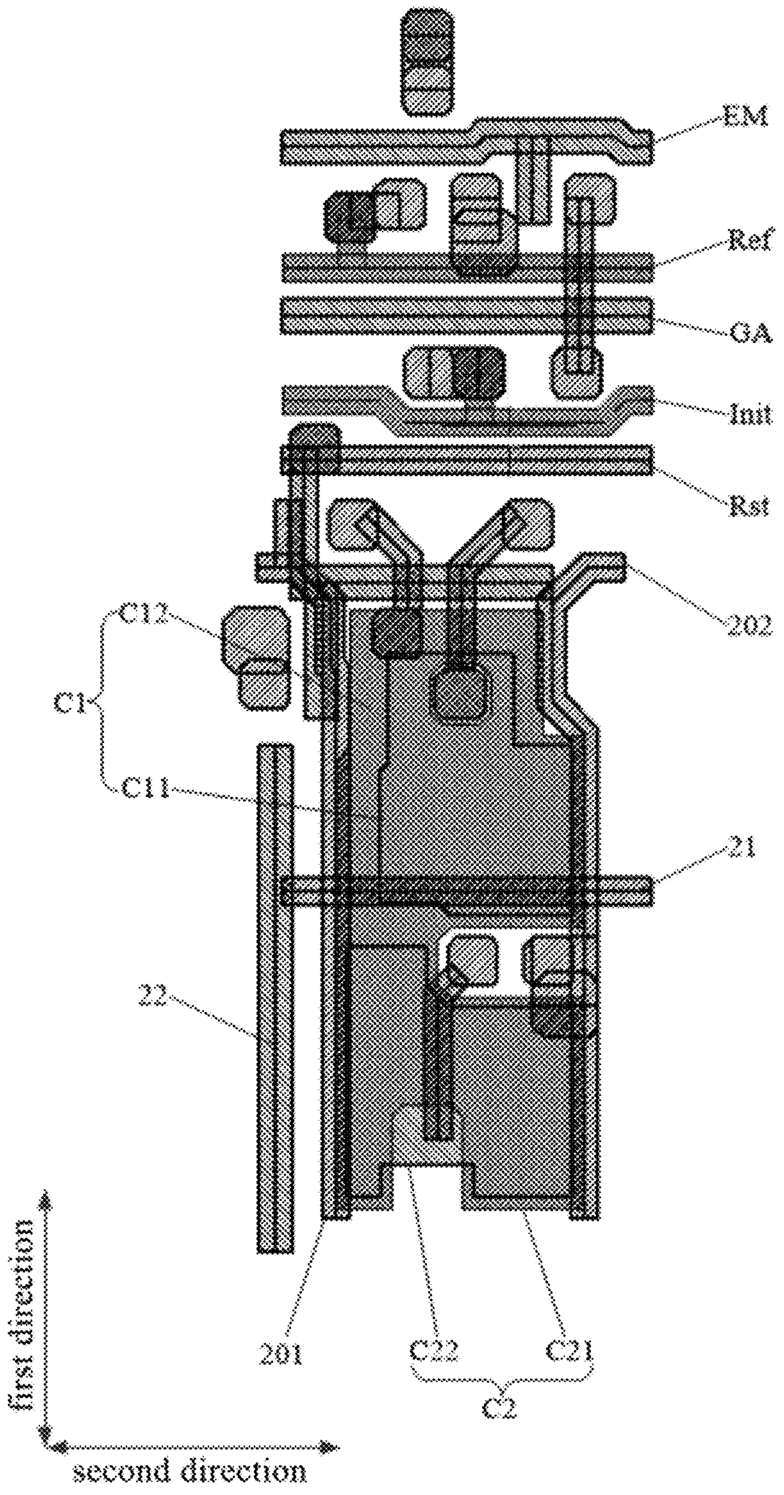
FIG. 8 is a schematic layout diagram of the first conductive layer, the second conductive layer, and the third conductive layer in FIG. 3.
Figure 9:
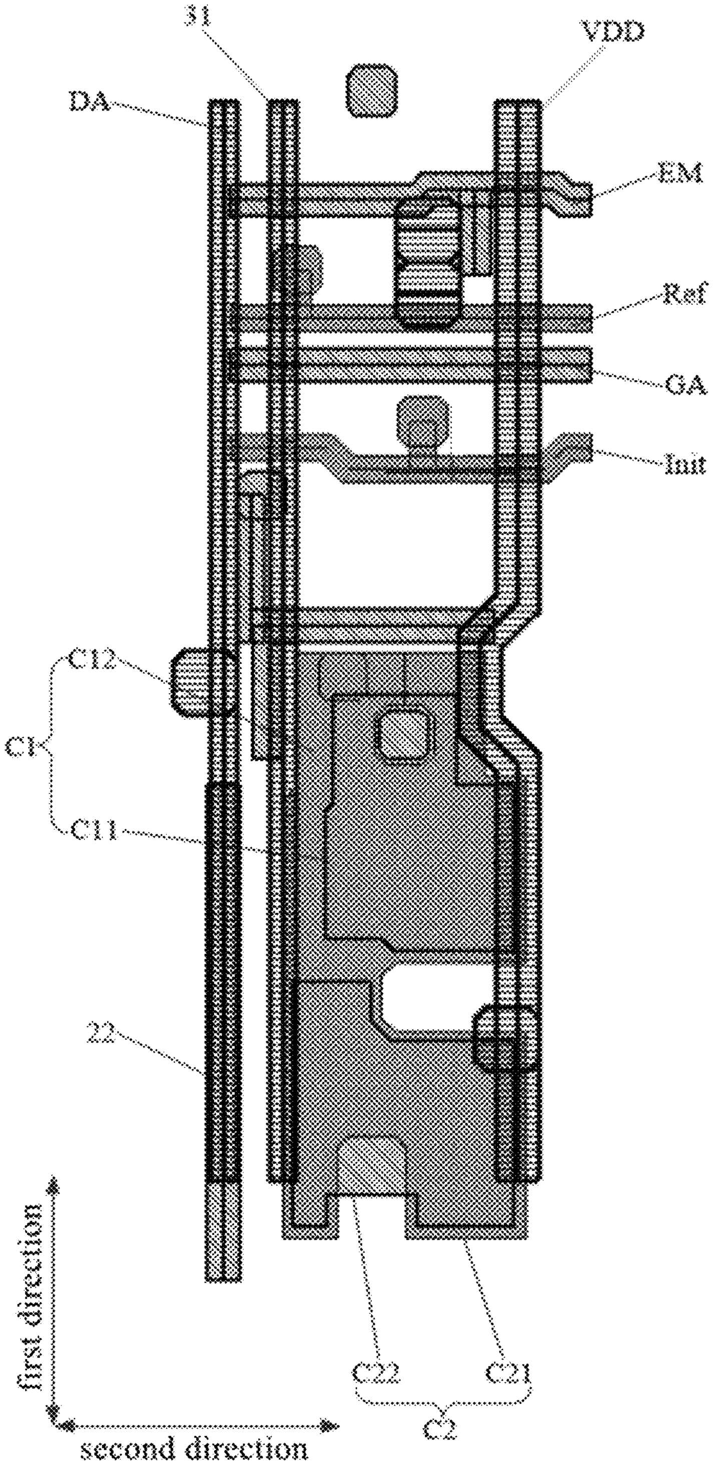
FIG. 9 is a schematic layout diagram of the first conductive layer, the second conductive layer, and the fourth conductive layer in FIG. 3.
Figure 10:
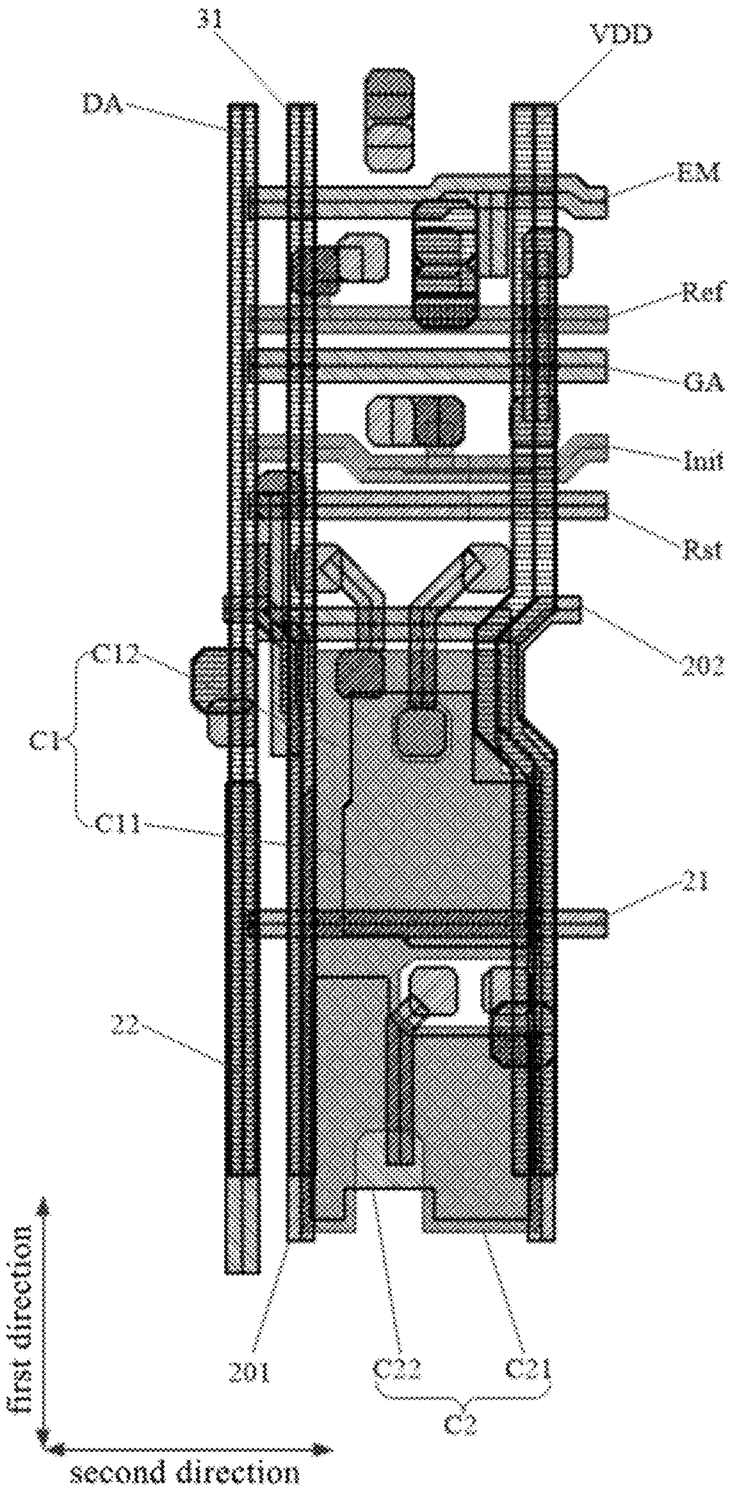
FIG. 10 is a schematic layout diagram of the first conductive layer, the second conductive layer, the third conductive layer, and the fourth conductive layer in FIG. 3.

As shown in FIG. 3, FIG. 4 and FIG. 6, in some embodiments, the display substrate further includes a reset line Rst, and the shielding line 21 and the reset line Rst are arranged along the first direction; the third conductive connection portion 43 and the fifth conductive connection portion 45 are located between the shielding line 21 and the reset line Rst.

The above layout method can reduce the layout difficulty of the pixel circuit while ensuring the shielding effect.

Figure 16:
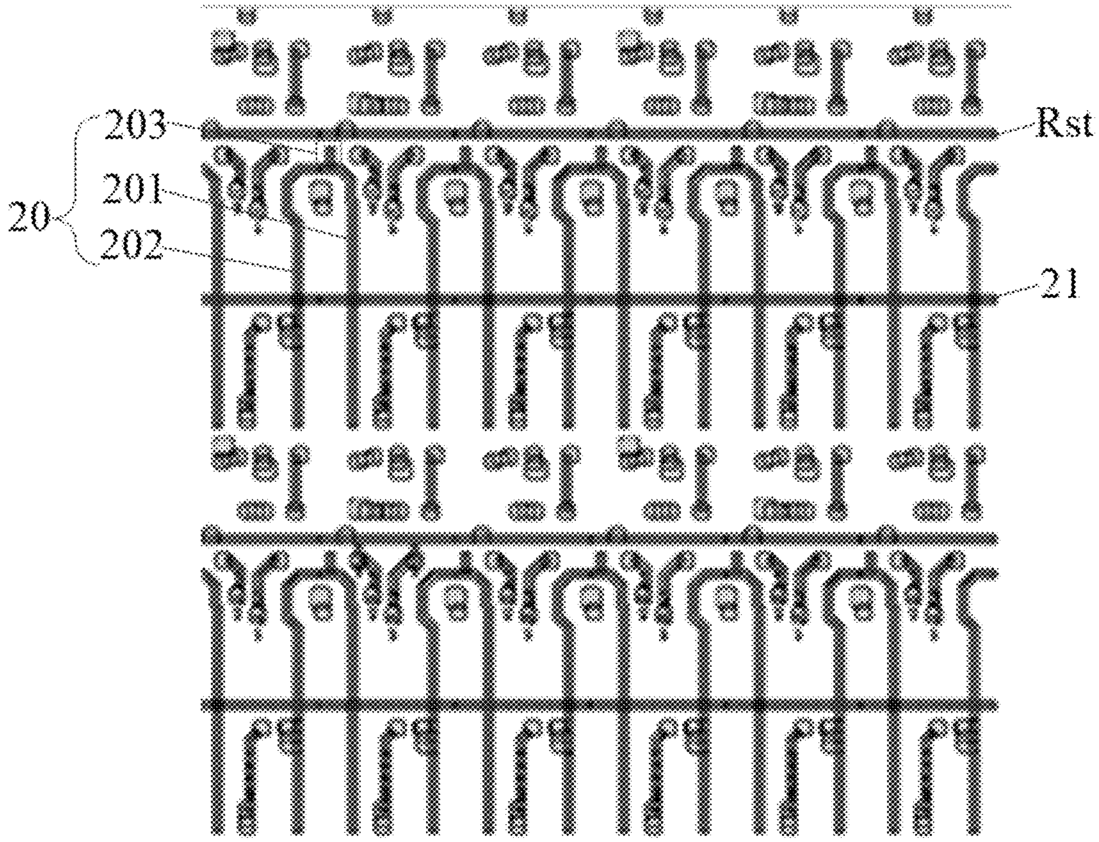
FIG. 16 is a schematic layout diagram of a third conductive layer in 2 rows and 6 columns of pixel driving circuits provided by an embodiment of the present disclosure.

As shown in FIG. 16, the first shielding pattern 20 further includes a third shielding portion 203, and an orthographic projection of the third shielding portion 203 on the base substrate is located between the orthographic projection of the data line DA on the base substrate and the fifth conductive connection portion 45.

The above arrangement is beneficial to shield the crosstalk of the data line DA to the fifth conductive connection portion 45.

It should be noted that the shielding lines 21 are respectively coupled to the first shielding patterns 20 located in the same row along the second direction, and the first shielding patterns 20 are coupled to the power supply lines, which enables the structure for transmission of power signals is formed into a grid shape, which is beneficial to reduce the loading of power signals and improve the overall display uniformity of the display substrate.

The connection position between the shielding line 21 and the first shielding pattern 20 can be set according to actual needs, as long as the normal working performance of the pixel driving circuit can be guaranteed. The shielding line 21 can be made into a straight line or a wave shape, or can also be arranged in sections.

The shielding line and the first shielding pattern may also not be connected to a power signal. Exemplarily, the shielding line and the first shielding pattern can be coupled to the reset line Rst and connected to a reset signal, so that the shielding effect can also be achieved.

As shown in FIGS. 3 to 10 and FIG. 16, in some embodiments, the plurality of first shielding patterns 20 are divided into a plurality of rows of first shielding patterns 20, and the shielding lines 21 and the corresponding row of first shielding patterns 20 are coupled respectively.

Exemplarily, the plurality of rows of first shielding patterns 20 correspond to the plurality of rows of pixel driving circuits in a one-to-one manner.

Exemplarily, the shielding line 21 is respectively coupled to the first shielding portion 201 and the second shielding portion 202 included in each first shielding pattern 20 in a corresponding row of first shielding patterns 20.

Exemplarily, the shielding line 21 and the first shielding portion 201 and the second shielding portion 202 included in each first shielding pattern 20 in the corresponding row of first shielding patterns 20 are all formed as an integral structure.

Exemplarily, in the same row of first shielding patterns 20, two surrounding structures are formed between adjacent first shielding patterns 20 and the shielding line 21 coupled to the adjacent first shielding patterns 20, and the orthographic projection of one surrounding structure on the base substrate surrounds at least a part of the orthographic projection of the first capacitor C1 on the base substrate; an orthographic projection of another surrounding structure on the base substrate surrounds at least a part of the orthographic projection of the second capacitor C2 on the base substrate.

The above arrangement effectively shields the crosstalk between the first capacitor C1 and the second capacitor C2.

As shown in FIG. 3 to FIG. 10, FIG. 16 and FIG. 19, in some embodiments, the display substrate includes a power supply line VDD, and the first shielding pattern 20 is coupled to the power supply line VDD.

Exemplarily, the display substrate includes a plurality of power supply lines VDD, the plurality of power supply lines VDD are in one-to-one correspondence with the plurality of columns of pixel driving circuits, and the power supply line VDD is coupled to the first electrode of the driving transistor included in each pixel driving circuit in a corresponding column of pixel driving circuits.

Exemplarily, the power supply line VDD is used to transmit a stable power signal.

Exemplarily, there is an overlapping area between the orthographic projection of the second shielding portion 202 on the base substrate and the orthographic projection of the power supply line VDD on the base substrate, and the second shielding portion 202 is coupled to the power supply line VDD at the overlapping area.

Exemplarily, along the first direction, adjacent second shielding portions 202 may be connected through a conductive structure, and the second shielding portion 202 close to the frame area of the display substrate may be connected to the power bus in the frame area to receive the power signal.

The first shielding pattern 20 is coupled to the power supply line VDD, so that the first shielding pattern 20 has a stable power signal, which is beneficial to improve the shielding effect.

As shown in FIG. 3 to FIG. 10 and FIG. 16, in some embodiments, the first shielding pattern 20, the shielding line 21 and the third conductive connection portion 43 are arranged on the same layer.

As shown in FIG. 3 to FIG. 10 and FIG. 16, in some embodiments, the first shielding pattern 20, the shielding line 21 and the third conductive connection portion 43 are manufactured by using the first shielding pattern in the display substrate.

The above arrangement is beneficial to reduce the resistance of the first shield pattern 20 and reduce the load on the power supply line VDD when transmitting power signals. At the same time, it is ensured that the first shielding pattern 20 has sufficient layout space, which reduces the difficulty of layout of the first shielding pattern 20.

As shown in FIG. 6, in some embodiments, the display substrate further includes a reset line Rst, and the shielding line 21 and the reset line Rst are arranged along the first direction; the third conductive connection portion 43 and the fifth conductive connection portion 45 are both located between the shielding line 21 and the reset line Rst.

As shown in FIG. 3 to FIG. 10 and FIG. 13, in some embodiments, the display substrate further includes:

A plurality of second shielding patterns 22, the second shielding pattern 22 include at least a portion extending along the first direction, the orthographic projection of the second shielding patterns 22 on the base substrate at least partially overlaps the orthographic projection of the data line DA on the base substrate.

Exemplarily, the plurality of second shielding patterns 22 correspond to the plurality of pixel driving circuits in the display substrate in a one-to-one manner, and the orthographic projection of the second shielding patterns 22 on the base substrate at least partially overlaps the orthographic projection of the data line DA coupled to the corresponding pixel driving circuit on the base substrate.

Exemplarily, at least a part of the orthographic projection of the second shielding pattern 22 on the base substrate is located between the orthographic projection of the first shielding portion 201 on the base substrate and the orthographic projection of the second shielding portion 202 on the base substrate.

The display substrate also includes the second shielding pattern 22, so that the second shielding pattern 22 can further shield the influence of the data line DA on the N1 node, the N2 node and the N3 node.

As shown in FIG. 3 to FIG. 10 and FIG. 13, in some embodiments, the display substrate further includes a plurality of second control lines EM; the second shielding patterns 22 located in the same row along the second direction are respectively coupled to a corresponding second control line EM.

Exemplarily, the plurality of second control lines EM correspond to the plurality of rows of pixel driving circuits in a one-to-one manner, and the second control lines EM is coupled to the gate electrode of the eighth transistor T8 included in each pixel driving circuit in the corresponding row of pixel driving circuits.

Exemplarily, the second control line EM coupled to the gate electrode of the eighth transistor T8 in the pixel driving circuit is multiplexed as the first control line EM' coupled to the ninth transistor T9 in the adjacent pixel driving circuit along the first direction.

The second shielding patterns 22 located in the same row along the second direction are respectively coupled to a corresponding second control line EM, so that the second shielding patterns 22 have the same potential as the second control line EM, so as to avoid that the second shield pattern 22 is in a floating state, which affects the stability of the pixel driving circuit.

In some embodiments, the orthographic projection of the second shielding pattern 22 on the base substrate is completely covered by the orthographic projection of the data line DA coupled to the corresponding pixel driving circuit on the base substrate.

In some embodiments, the orthographic projection of the second shielding pattern 22 on the base substrate does not overlap the orthographic projection of the data line DA coupled to the corresponding pixel driving circuit on the base substrate.

In some embodiments, the display substrate further includes a power supply line VDD and an initialization signal line Init, and the second shield pattern 22 is coupled to the power supply line VDD or to the initialization signal line Init.

In some embodiments, the second shielding pattern is coupled to the power supply line in the display substrate, so that the second shielding pattern has the same potential as the power signal, so as to avoid that the second shielding pattern is in a floating state, thereby affecting the stability of the pixel driving circuit.

In some embodiments, the second shielding pattern is coupled to the initialization signal line in the display substrate, so that the second shielding pattern has the same potential as the initialization signal, so as to avoid that the second shielding pattern is in a floating state, thereby affecting the stability of the pixel driving circuit.

As shown in FIG. 3 to FIG. 10 and FIG. 13, in some embodiments, the second shielding patterns 22 located in the same row along the second direction form an integral structure with a corresponding second control line EM.

Exemplarily, both the second shielding pattern 22 and the second control line EM are made of the first conductive layer in the display substrate.

The above arrangement enables the second shielding pattern 22 and the second control line EM to be formed simultaneously in the same patterning process, which is beneficial to simplify the manufacturing process of the display substrate.

As shown in FIGS. 3 to 10, FIG. 11, FIG. 14, FIG. 19 and FIG. 21, in some embodiments, the display substrate further includes:

a plurality of initialization signal lines Init arranged along the first direction, the initialization signal line Init including at least a portion extending along the second direction;

A plurality of initial connection lines 30 arranged along the second direction, the initial connection line 30 including at least a portion extending along the first direction, each initial connection line 30 is respectively coupled to the plurality of initialization signal lines Init. A2 in FIG. 21 shows the connection between the initialization signal line Init and the initial connection line 30.

Exemplarily, the plurality of initialization signal lines Init correspond to the plurality of rows of pixel driving circuits in a one-to-one manner, and the fourth transistor T4, the fifth transistor T5, the sixth transistor T6 and the seventh transistor in the same pixel driving circuit T7 is coupled to the corresponding same initialization signal line Init.

The display substrate includes the plurality of initialization signal lines Init and the plurality of initial connection lines 30, so that the plurality of initialization signal lines Init and the plurality of initial connection lines 30 form a grid structure, which effectively reduce the loading and IR Drop of the initialization signal line Init when transmitting the initialization signal.

As shown in FIGS. 3 to 10, FIG. 11, FIG. 14, FIG. 19 and FIG. 21, in some embodiments, the display substrate further includes:

a plurality of reference signal lines Ref arranged in the first direction, the reference signal line Ref including at least a portion extending along the second direction;

A plurality of reference connection lines 31 arranged along the second direction, the reference connection line 31 including at least a portion extending along the first direction, each of the reference connection lines 31 is respectively connected to the plurality of reference signal lines Ref. A1 in FIG. 21 shows the connection position of the reference signal line Ref and the reference connection line 31.

Exemplarily, the plurality of reference signal lines Ref are in one-to-one correspondence with the plurality of rows of pixel driving circuits, and the reference signal line Ref is respectively coupled to the ninth transistor T9 included in each pixel driving circuit in the corresponding row of pixel driving circuits.

The display substrate includes the plurality of reference signal lines Ref and the plurality of reference connection lines 31, so that the plurality of reference signal lines Ref and the plurality of reference connection lines 31 form a grid structure, the loading and IR Drop of the reference signal line Ref when transmitting the reference signal are effectively reduced. The driving current of the pixel driving circuit to drive the light emitting element is related to the reference signal, and the effect of reducing loading and IR drop is beneficial to optimize the data range of the data signal transmitted by the data line DA.

As shown in FIGS. 3 to 10, FIG. 11, FIG. 14, FIG. 19 and FIG. 21, in some embodiments, the initial connection lines 30 and the reference connection lines 31 are arranged alternately along the second direction;

The plurality of pixel driving circuits are divided into a plurality of columns of pixel driving circuits, each column of pixel driving circuits corresponds to one of the initial connection lines 30 or corresponds to one of the reference connection lines 31;

The orthographic projection of the initial connection line 30 on the base substrate at least partially overlaps the orthographic projection of the second electrode plate C12 in the corresponding column of pixel driving circuits on the base substrate; and/or, The orthographic projection of the reference connection line 31 on the base substrate at least partially overlaps the orthographic projection of the second electrode plate C12 in the corresponding column of pixel driving circuits on the base substrate.

Exemplarily, the orthographic projection of the initial connection line 30 on the base substrate does not overlap the orthographic projection of the first electrode plate C11 in the corresponding column of pixel driving circuits on the base substrate.

Exemplarily, the orthographic projection of the initial connection line 30 on the base substrate at least partially overlaps the orthographic projection of the third electrode plate C21 in the corresponding column of pixel driving circuits on the base substrate.

Exemplarily, the orthographic projection of the initial connection line 30 on the base substrate at least partially overlaps the orthographic projection of the fourth electrode plate C22 in the corresponding column of pixel driving circuits on the base substrate.

Exemplarily, the orthographic projection of the reference connection line 31 on the base substrate does not overlap the orthographic projection of the first electrode plate C11 in the corresponding column of pixel driving circuits on the base substrate.

Exemplarily, the orthographic projection of the reference connection line 31 on the base substrate at least partially overlaps the orthographic projection of the third electrode plate C21 in the corresponding column of pixel driving circuits on the base substrate.

Exemplarily, the orthographic projection of the reference connection line 31 on the base substrate at least partially overlaps the orthographic projection of the fourth electrode plate C22 in the corresponding column of pixel driving circuits on the base substrate.

Layout of the reference connection line 31 and the initial connection line 30 in the above manner effectively reduces the difficulty of layout of the reference connection line 31 and the initial connection line 30.

As shown in FIG. 6, in some embodiments, the display substrate further includes a plurality of reset lines Rst, and the reset line Rst includes at least a portion extending along the second direction, and the reset lines Rst and the third conductive connection portion 43 are arranged on the same layer.

As shown in FIG. 3 to FIG. 10 and FIG. 16, in some embodiments, the display substrate further includes a plurality of reset lines Rst, and the reset line Rst includes at least a part extending along the second direction, the reset line Rst is made using the third conductive layer in the display substrate.

Exemplarily, the plurality of reset lines Rst are in one-to-one correspondence with the plurality of rows of pixel driving circuits, and the first transistor T1, the fourth transistor T4 and the fifth transistor T5 in the same pixel driving circuit are respectively coupled to the corresponding reset line Rst.

The reset line Rst above is made using the third conductive layer in the display substrate, which effectively reduces the resistance of the reset line Rst, and reduces the overall loading and IR drop of the first conductive layer in the display substrate.

As shown in FIGS. 3 to 10, in some embodiments, the pixel driving circuit includes a second transistor T2, a fourth transistor T4, a fifth transistor T5 and a seventh transistor T7, the second transistor T2, the fourth transistor T4, the fifth transistor T5 and the seventh transistor T7 adopt a double-gate structure.

The second transistor T2, the fourth transistor T4, the fifth transistor T5 and the seventh transistor T7 adopts a double-gate structure, which is beneficial to improve the current leakage of the N1 node and the N2 node.

More specifically, the display substrate includes an active layer, a first gate insulating layer, a first conductive layer, a second gate insulating layer, a second conductive layer, an interlayer insulation layer, a third conductive layer, a first planarization layer, a fourth conductive layer, a second planarization layer, an anode layer, a light emitting functional layer, a cathode layer and an encapsulation layer sequentially stacked in a direction away from the base substrate. The display substrate may further include a passivation layer between the first planarization layer and the fourth conductive layer.

Exemplarily, the first conductive layer includes a first gate metal layer, the second conductive layer includes a second gate metal layer, the third conductive layer includes a first source-drain metal layer, and the fourth conductive layer includes the second source-drain metal layer.

The active layer is used to form: the first active layer included in the first transistor T1, the second active layer included in the first transistor T1, the third active layer included in the third transistor T3, the fourth active layer included in the fourth transistor T4, the fifth active layer included in the fifth transistor T5, the sixth active layer included in the sixth transistor T6, the seventh active layer included in the seventh transistor T7, the eighth active layer included in the eighth transistor T8, and the ninth active layer included in the ninth transistor T9.

The first conductive layer is used to form: the gate electrode of the first transistor T1, the gate electrode of the second transistor T2, the gate electrode T3-*g* of the third transistor T3 (that is, the first electrode plate C11), the gate electrode of the fourth transistor T4, the gate electrode of the fifth transistor T5, the gate electrode of the sixth transistor T6, the gate electrode of the seventh transistor T7, the gate electrode of the eighth transistor T8, the gate electrode of the ninth transistor T9, the scanning line GA, the second control line EM, the fourth electrode plate C22, and the second shielding pattern 22.

The second conductive layer is used to form: the initialization signal line Init, the reference signal line Ref, the second electrode plate C12, and the third electrode plate C21.

The third conductive layer is used to form: the first conductive connection portion 41, the second conductive connection portion 42, the third conductive connection portion 43, the fourth conductive connection portion 44, the fifth conductive connection portion 45, the sixth conductive connection portion 46, the eighth conductive connection portion 48 and the ninth conductive connection portion 49.

The first electrode of the first transistor T1 is coupled to the corresponding data line DA through the first conductive connection portion 41. The second electrode of the first transistor T1 is coupled to the fourth electrode plate C22 through the second conductive connection portion 42. The second electrode of the second transistor T2 is coupled to the gate electrode T3-*g* of the third transistor T3 through the third conductive connection portion 43. The first electrode of the third transistor T3 is coupled to the power supply line VDD through the second shielding portion 202. The first electrode of the fourth transistor T4, the first electrode of the fifth transistor T5, the first electrode of the sixth transistor T6 and the first electrode of the seventh transistor T7 form an integrated structure, and is connected to the initialization signal line Init through the fourth conductive connection portion 44. The second electrode of the fifth transistor T5 is coupled to the second electrode plate C12 through the fifth conductive connection portion 45, and the second electrode of the sixth transistor T6 is connected to the anode of the corresponding light emitting element through the sixth conductive connection portion 46 and the seventh conductive connection portion 47. The first electrode of the eighth transistor T8 is coupled to the second electrode of the third transistor T3 through the eighth conductive connection portion 48. The first electrode of the ninth transistor T9 is coupled to the reference signal line Ref through the ninth conductive connection portion 49. The second electrode of the ninth transistor T9 is coupled to the multiplexed second control line EM through the second conductive connection portion 42.

As shown in FIG. 6, the first conductive connection portion 41 includes a strip structure, at least part of the first conductive connection portion 41 extends along the first direction, and the width of the first conductive connection portion 41 in the second direction is uneven, the width of one terminal of the first conductive connection portion 41 connected to the data line DA in the second direction is greater than the width of the terminal of the first conductive connection portion 41 connected to the first electrode of the first transistor T1 in the second direction.

The second conductive connection portion 42 includes a strip structure, at least part of the second conductive connection portion 42 extends along the first direction, and the width of the second conductive connection portion 42 in the second direction is uniform.

The third conductive connecting portion 43 includes a strip structure, the third conductive connecting portion 43 includes a portion extending along the first direction and a portion extending along a third direction, the third direction intersects each of the first direction and the second directions.

The fourth conductive connection portion 44 includes a strip structure, at least part of the fourth conductive connection portion 44 extends along the second direction, and the width of the fourth conductive connection portion 44 in the first direction is uniform.

The fifth conductive connection portion 45 includes a strip structure, the fifth conductive connection portion 45 includes a portion extending along the first direction and a portion extending along the fourth direction, the fourth direction intersects each of the first direction, the second direction and the third direction.

The sixth conductive connection portion 46 includes a strip structure, at least part of the sixth conductive connection portion 46 extends along the first direction, and the width of the sixth conductive connection portion 46 in the second direction is uneven.

The eighth conductive connection portion 48 includes a strip structure, and at least part of the eighth conductive connection portion 48 extends along the first direction.

The ninth conductive connection portion 49 includes a strip structure, and at least part of the ninth conductive connection portion 49 extends along the second direction.

The width of the terminal of the conductive connection portions of the strip structure connected to other conductive structures is relatively wide, so as to ensure the reliability of the connection.

The fourth conductive layer is used to form: the seventh conductive connection portion 47, the power supply line VDD, the data line DA, the initial connection line 30, and the reference connection line 31.

The seventh conductive connection portion 47 includes a strip structure, and at least part of the seventh conductive connection portion 47 extends along the first direction.

Figure 23:
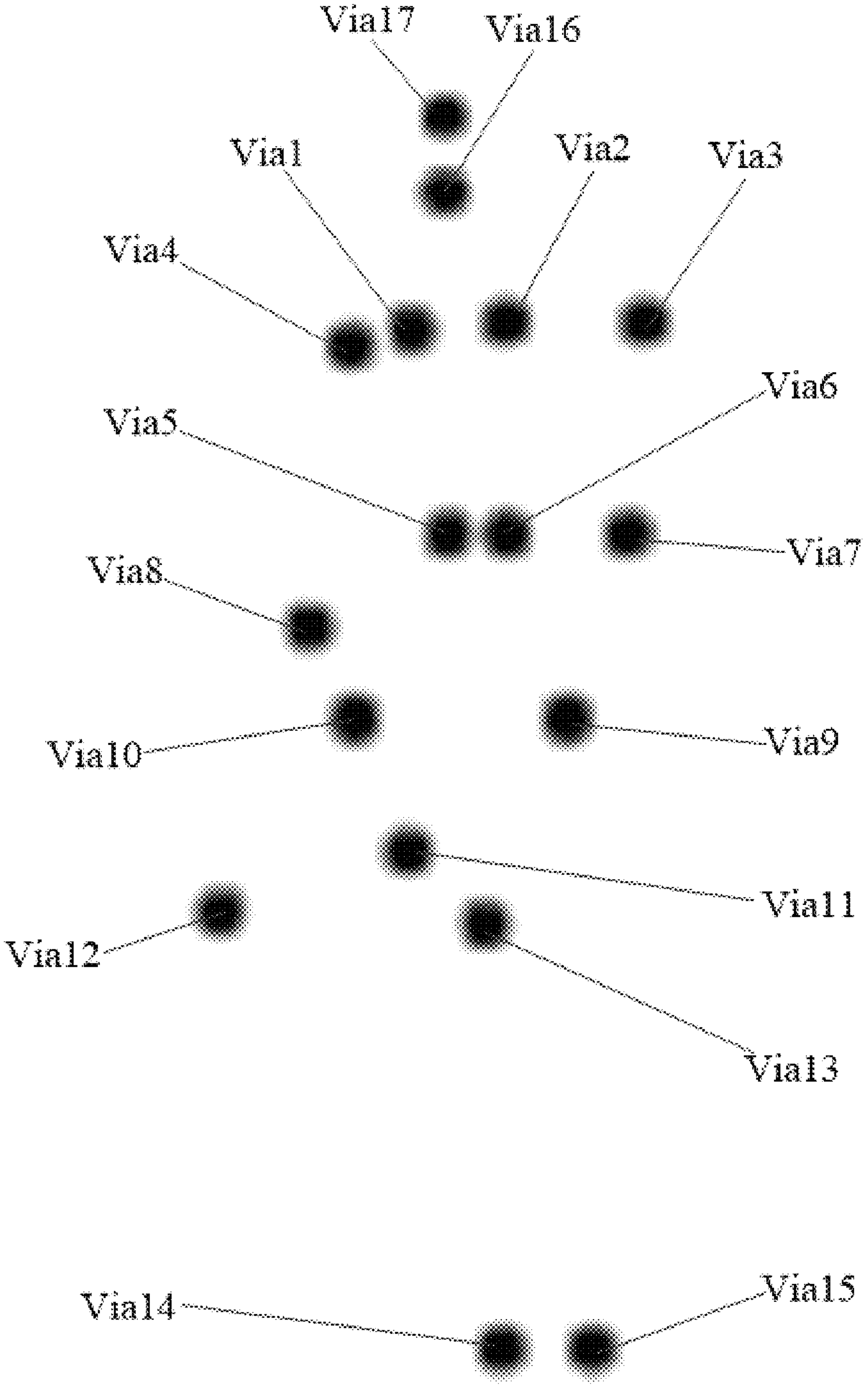
FIG. 23 is a schematic diagram of a via hole formed on an interlayer insulating layer in a pixel driving circuit provided by an embodiment of the present disclosure.

As shown in FIG. 23, it is a schematic diagram of the positions of via holes formed on the interlayer insulating layer in FIG. 3. As shown in FIG. 3, FIG. 4, FIG. 22 and FIG. 23, the first via hole Via1 is used to connect the ninth conductive connection portion 49 and the first electrode of the ninth transistor T9. The second via hole Via2 is used to connect the second electrode of the sixth transistor T6 (or the second electrode of the eighth transistor T8) and the sixth conductive connection portion 42. The third via hole Via3 is used to connect the first electrode of the eighth transistor T8 and the eighth conductive connection portion 48. The fourth via hole Via4 is used to connect the ninth conductive connection portion 49 and the reference signal line Ref. The fifth via hole Via5 is used to connect the fourth conductive connection portion 44 and the first electrode of the seventh transistor T7 (or the first electrode of the sixth transistor T6, or the first electrode of the fifth transistor T5, or the first electrode of the fourth transistor T4). The sixth via hole Via6 is used to connect the fourth conductive connection portion 44 and the initialization signal line Init. The seventh via hole Via7 is used to connect the eighth conductive connection portion 48 and the second electrode of the third transistor T3 (or the second electrode of the second transistor T2). The eighth via Via8 is used to connect the reset line Rst and the gate electrode of the first transistor T1 (or the gate electrode of the fourth transistor T4, or the gate electrode of the fifth transistor T5). The ninth via hole Via9 is used to connect the second electrode of the fourth transistor T4 and the third conductive connection portion 43. The tenth via hole Via10 is used to connect the second electrode of the fifth transistor T5 and the fifth conductive connection portion 45. The eleventh via hole Via11 is used to connect the fifth conductive connection portion 45 and the second electrode plate C12. The twelfth via hole Via12 is used to connect the first electrode of the first transistor T1 and the first conductive connection portion 41. The thirteenth via hole Via13 is used to connect the third conductive connection portion 43 and the first electrode plate C11. The fourteenth via hole Via14 is used to connect the second conductive connection portion 42 and the second electrode of the first transistor T1. The fifteenth via hole Via15 is used to connect the first electrode of the third transistor T3 and the second shielding portion 202. The sixteenth via hole Via16 is used to connect the second conductive connection portion 42 and the second electrode of the ninth transistor T9. The seventeenth via hole Via17 is used to connect the second conductive connection portion 42 and the fourth electrode plate C22.

The orthographic projections of the first via hole Via1, the second via hole Via2, the third via hole Via3 and the fourth via hole Via4 on the base substrate are located between the orthographic projection of the second control line EM on the base substrate and the orthographic projection of the reference signal line Ref on the base substrate. The orthographic projections of the fifth via hole Via5, the sixth via hole Via6 and the seventh via hole Via7 on the base substrate are located between the orthographic projection of the scanning line GA on the base substrate and the orthographic projection of the initialization signal line Init on the base substrate. The orthographic projections of the ninth via hole Via9 and the tenth via hole Via10 on the base substrate are located between the orthographic projection of the reset line Rst on the base substrate and the orthographic projection of the gate electrode of the fourth transistor T4 (or the gate electrode of the fifth transistor T5) on the base substrate. It should be noted that the gate electrode of the fourth transistor T4, the gate electrode of the fifth transistor T5 and the gate electrode of the first transistor T1 form an integral structure, as marked T-g. The orthographic projection of the eleventh via hole Via11 and the thirteenth via hole Via13 on the base substrate is located between the orthographic projection of the gate electrode of the fourth transistor T4 (or the gate electrode of the fifth transistor T5) on the base substrate and the orthographic projections of the shielding line 21 on the base substrate. The orthographic projections of the fourteenth via hole Via14, the fifteenth via hole Via15, the sixteenth via hole Via16 and the seventeenth via hole Via17 on the base substrate are located between the orthographic projection of the shielding line 21 on the base substrate and the orthographic projection of the second control line EM connected to the adjacent next row of sub-pixels in the first direction on the base substrate.

Figure 24:
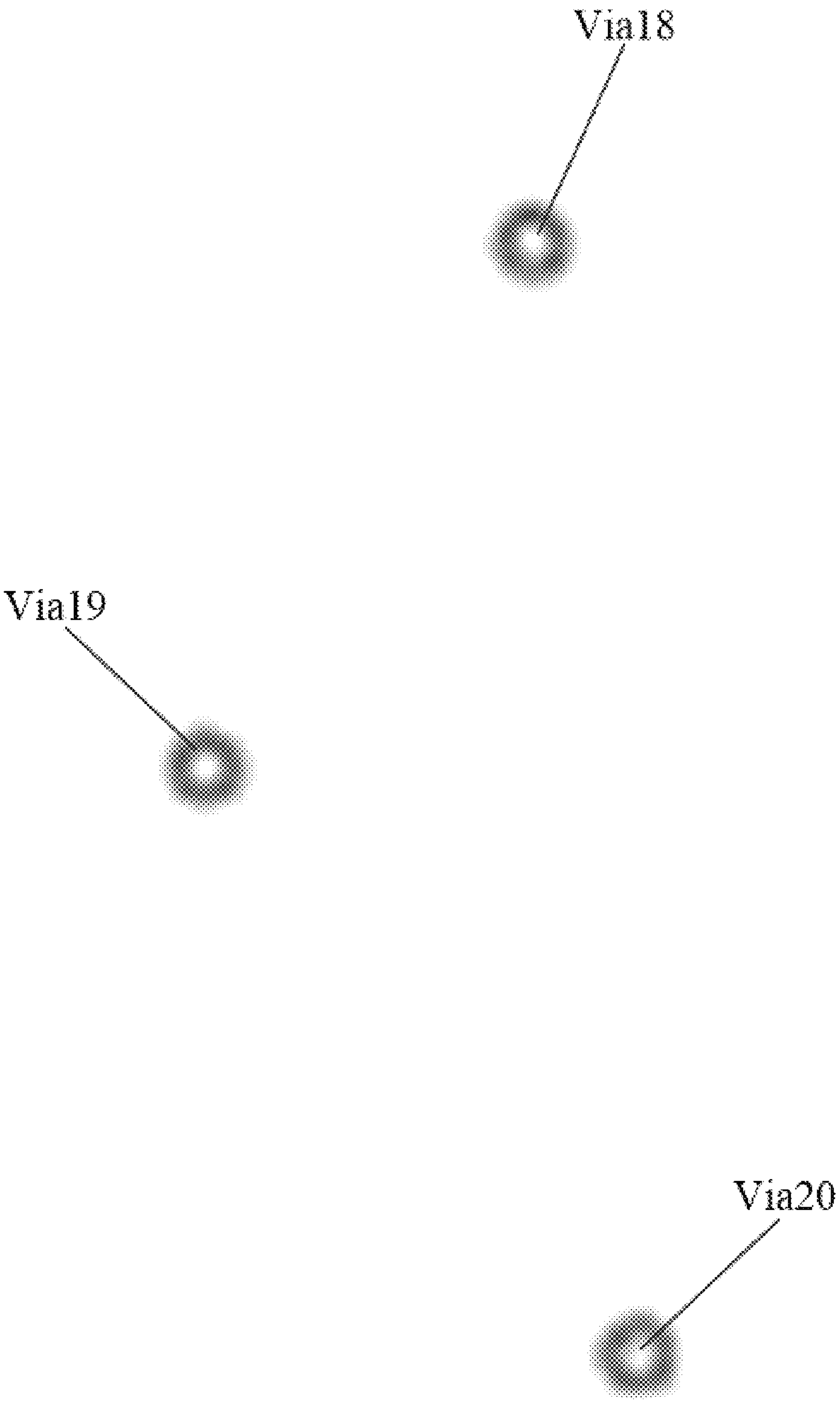
FIG. 24 is a schematic diagram of the positions of via holes formed on the first planarization layer in the pixel driving circuit provided by an embodiment of the present disclosure.

As shown in FIG. 24, it is a schematic diagram of the positions of via holes formed on the first planarization layer in FIG. 3. As shown in FIG. 3, FIG. 4, FIG. 22 and FIG. 24, the eighteenth via hole Via18 is used to connect the seventh conductive connection portion 47 and the sixth conductive connection portion 46. The nineteenth via hole Via19 is used to connect the data line DA and the first conductive connection portion 41. The twentieth via hole Via20 is used to connect the second shielding portion 202 and the power supply line VDD.

The orthographic projection of the eighteenth via hole Via18 on the base substrate is located between the orthographic projection of the second control line EM on the base substrate and the orthographic projection of the reference signal line Ref on the base substrate. The orthographic projection of the nineteenth via hole Via19 on the base substrate is adjacent to the orthographic projection of the twelfth via hole Via12 on the base substrate. The orthographic projection of the twentieth via hole Via20 on the base substrate is located between the orthographic projection of the shielding line 21 on the base substrate and the orthographic projection of the second control line EM connected to the adjacent next row of sub-pixels along the first direction on the base substrate.

Figure 25:
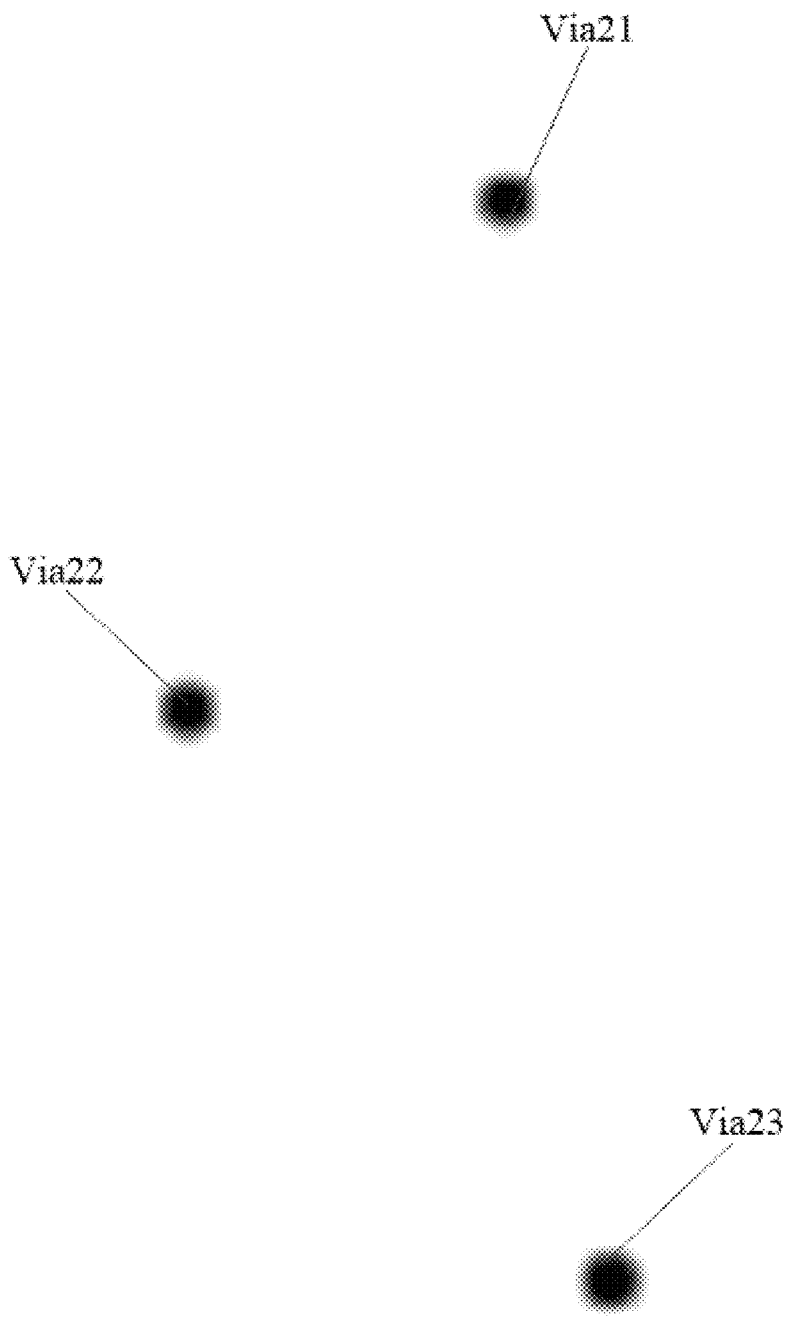
FIG. 25 is a schematic diagram of the positions of via holes formed on the second planarization layer in the pixel driving circuit provided by an embodiment of the present disclosure.

As shown in FIG. 25, it is a schematic diagram of the positions of via holes formed on the passivation layer in FIG. 3. The orthographic projection of the twenty-first via hole Via21 on the base substrate at least partially overlaps the orthographic projection of the eighteenth via hole Via18 on the base substrate. The orthographic projection of the twenty-second via hole Via22 on the base substrate at least partially overlaps the orthographic projection of the nineteenth via hole Via19 on the base substrate. The orthographic projection of the twenty-third via hole Via23 on the base substrate at least partially overlaps the orthographic projection of the twentieth via hole Via20 on the base substrate.

The twenty-first via hole Via21 is used to connect the seventh conductive connection portion 47 and the sixth conductive connection portion 46. The twenty-second via hole Via22 is used to connect the data line DA and the first conductive connection portion 41. The twenty-third via hole Via23 is used to connect the second shielding portion 202 and the power supply line VDD.

As shown in FIG. 20, it is a schematic diagram of the positions of via holes formed on the second planarization layer in FIG. 3. The twenty-fourth via hole Via24 is used to connect the seventh conductive connection portion 47 and the corresponding anode pattern.

As shown in FIGS. 21 and 17, the twenty-fifth via hole Via25 is located in the dashed box at A2, and the twenty-fifth via hole Via25 is used to connect the initial connection line 30 and the fourth conductive connection portion 44. The twenty-sixth via hole Via26 is located in the dotted line box at A1, and the twenty-sixth via hole Via26 is used to connect the reference connection line 31 and the ninth conductive connection portion 49.

Figure 18:
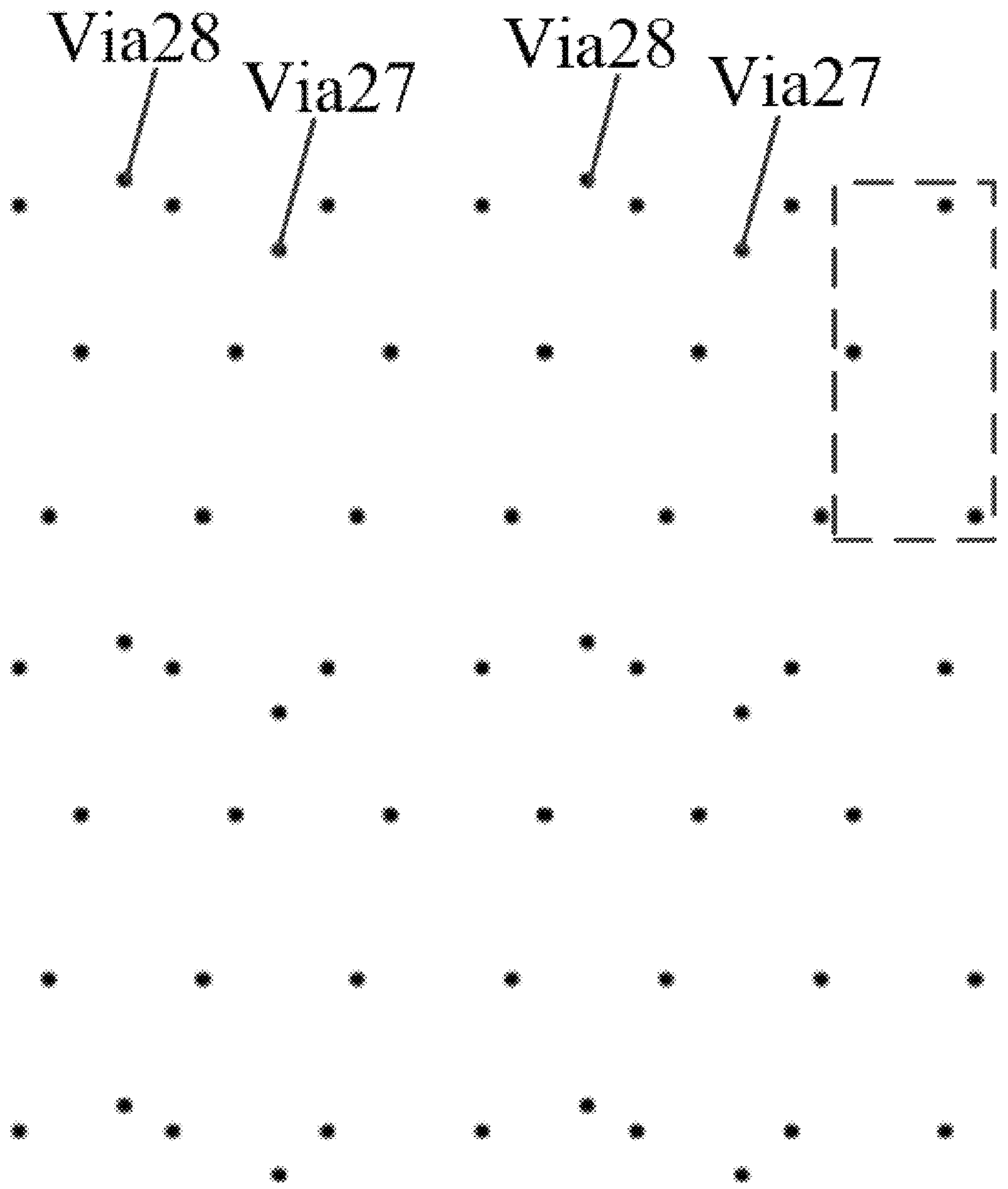
FIG. 18 is a schematic diagram of the positions of via holes formed on the passivation layer in 2 rows and 6 columns of pixel driving circuits provided by an embodiment of the present disclosure.
Figure 19:
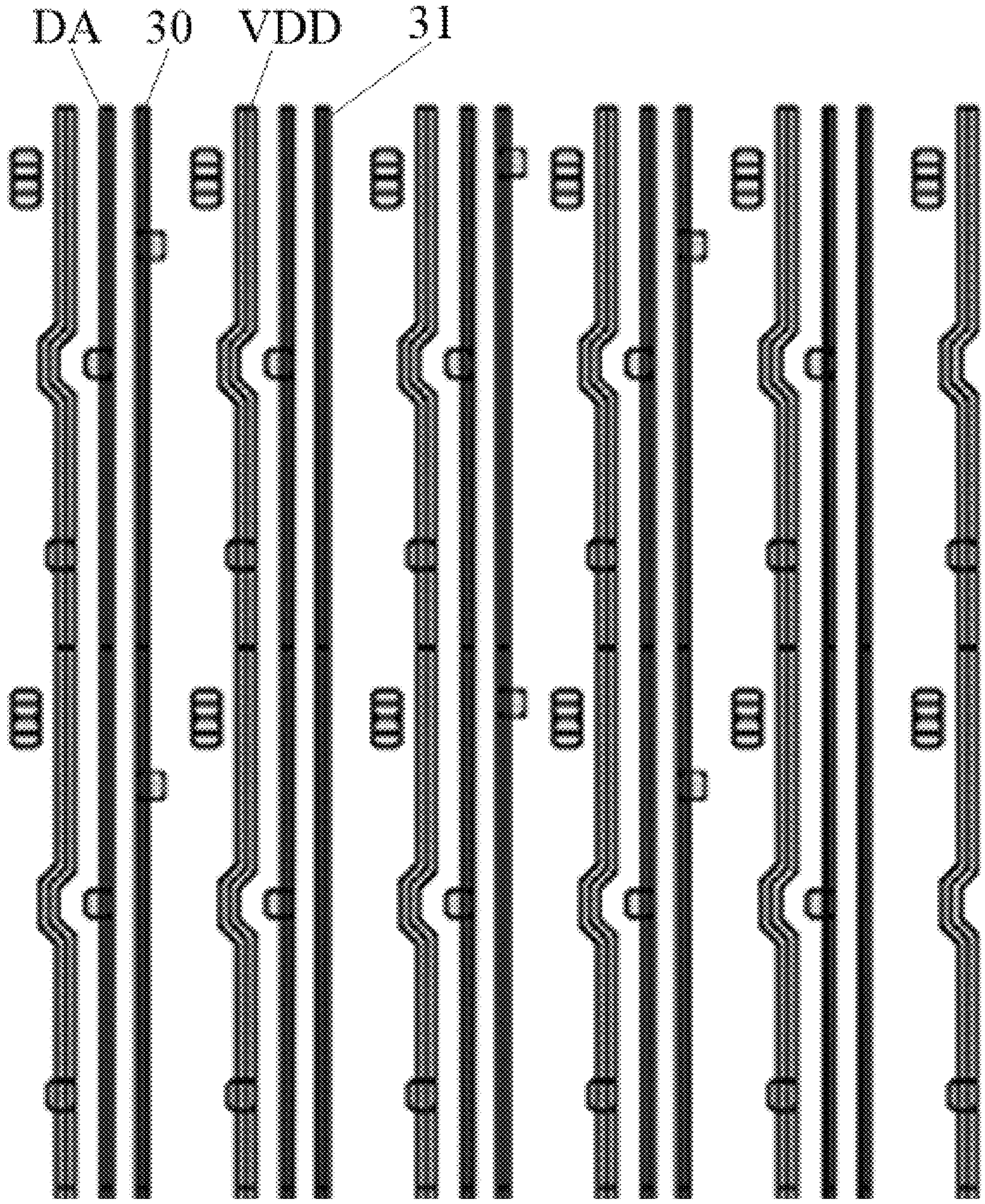
FIG. 19 is a schematic layout diagram of a fourth conductive layer in 2 rows and 6 columns of pixel driving circuits provided by an embodiment of the present disclosure.

As shown in FIG. 18, the orthographic projection of the twenty-seventh via hole Via27 on the base substrate at least partially overlaps the orthographic projection of the twenty-fifth via hole Via25 on the base substrate. The orthographic projection of the twenty-eighth via hole Via28 on the base substrate at least partially overlaps the orthographic projection of the twenty-sixth via hole Via26 on the base substrate. The twenty-seventh via hole Via27 is used to connect the initial connection line 30 and the fourth conductive connection portion 44. The twenty-eighth via hole Via28 is used to connect the reference connection line 31 and the ninth conductive connection portion 49.

As shown in FIG. 4, in some embodiments, the active layer included in the ninth transistor T9 is an independent active layer. The active layer included in the first transistor T1 is an independent active layer. The active layers included in the second transistor T2 to the eighth transistor T8 form an integral structure.

As shown in FIG. 4, in some embodiments, the shape of the channel portion of the third transistor T3 may be I-shaped. Of course, it can also be set to other shapes, such as S-shaped or a shape of character "几", but not limited thereto.

As shown in FIG. 4, in some embodiments, the active layer corresponding to the first transistor T1 includes two portions, one portion is located on one side of the first electrode plate C11 along the second direction, and the orthographic projection of the other portion on base substrate is located between the orthographic projection of the first electrode plate C11 on the base substrate and the orthographic projection of the fourth electrode plate C22 on the base substrate.

As shown in FIG. 4, in some embodiments, the active layer corresponding to the first transistor T1 and the active layer corresponding to the third transistor T3 are arranged along the second direction.

As shown in FIG. 4, in some embodiments, the active layer corresponding to the second transistor T2, and the active layer corresponding to the fourth transistor T4 to the active layer corresponding to the ninth transistor T9 are all located on the same side of the active layer corresponding to the third transistor T3 along the first direction. In the same pixel driving circuit: the active layer corresponding to the fourth transistor T4 and the active layer corresponding to the fifth transistor T5 are closest to the active layer corresponding to the third transistor T3; the active layer corresponding to the eighth transistor T8 is farthest from the active layer corresponding to the third transistor T3; the active layer corresponding to the second transistor T2 and the active layer corresponding to the sixth transistor T6 are both located between the active layer corresponding to the eighth transistor T8 and the active layer corresponding to the fourth transistor T4; the active layer corresponding to the seventh transistor T7, the active layer corresponding to the sixth transistor T6, and the active layer corresponding to the second transistor T2 are arranged in sequence along the second direction.

As shown in FIG. 3 and FIG. 4, in some embodiments, the gate electrode of the fourth transistor T4, the gate electrode of the fifth transistor T5, and the gate electrode of the first transistor T1 form an integrated gate pattern. The gate pattern includes a portion extending along the first direction and a portion extending along the second direction, at least part of the portion extending along the first direction is used as the gate electrode of the first transistor T1, and the portion extending along the second direction is used as the gate electrode of the fourth transistor T4 and the gate electrode of the fifth transistor T5. The gate pattern is coupled to the reset line Rst.

As shown in FIG. 4, in some embodiments, in the same pixel driving circuit: the second control line EM, the scanning line GA, the gate pattern, the first electrode plate C11 and the fourth electrode plate C22 are arranged sequentially along the first direction.

Figure 5:
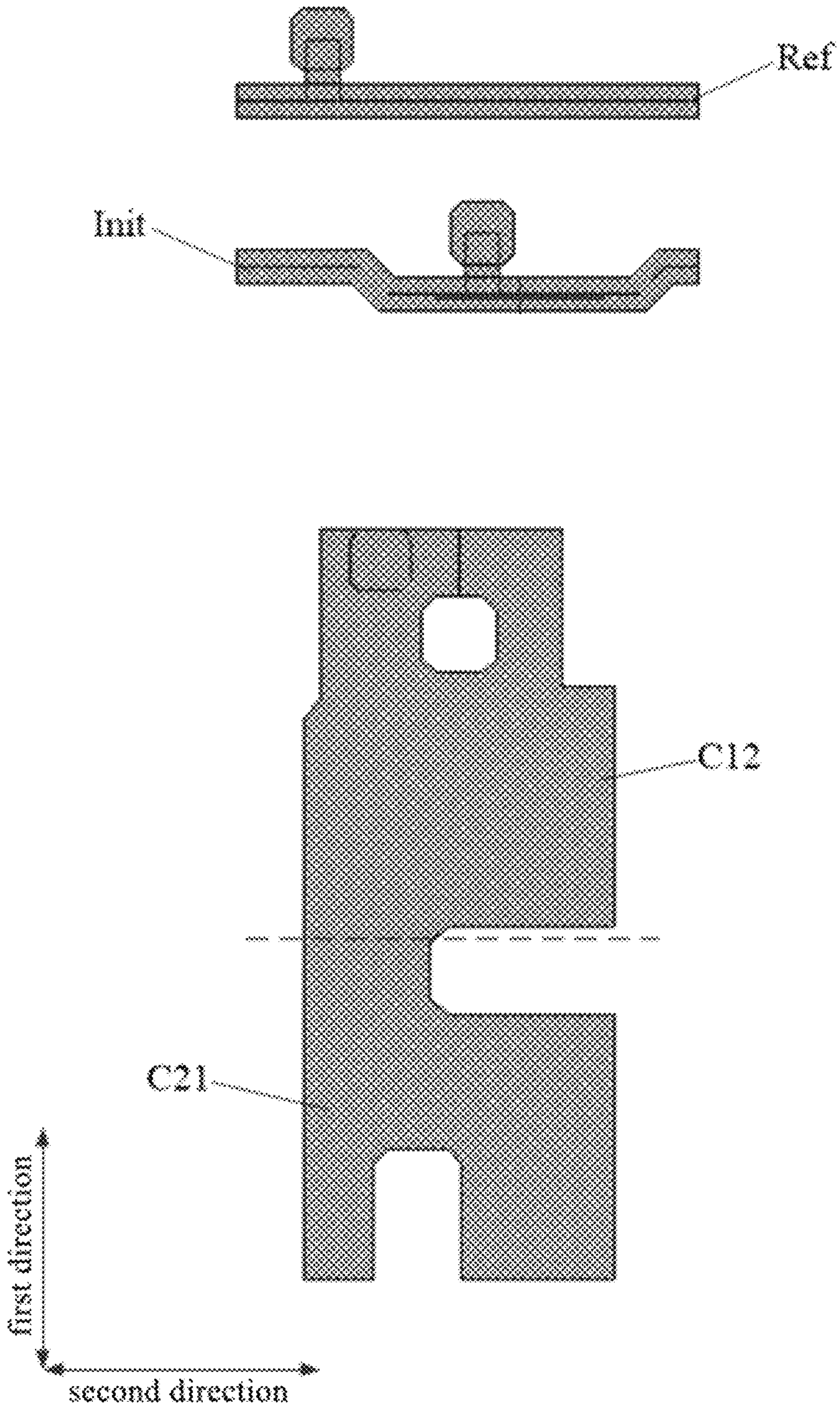
FIG. 5 is a schematic layout diagram of the second conductive layer in FIG. 3.

As shown in FIG. 5, in some embodiments, in the same pixel driving circuit: the reference signal line Ref, the initialization signal line Init, the second electrode plate C12, and the third electrode plate C21 are arranged sequentially along the first direction.

Embodiments of the present disclosure also provide a display device, including the display substrate provided in the above embodiments.

In the display substrate provided by the above embodiment, at least part of the orthographic projection of the first shielding pattern on the base substrate is located between the orthographic projection of the data line on the base substrate and the orthographic projection of the first electrode plate on the base substrate, so that the first shielding pattern can shield the influence between the data line and the N1 node, and reduce the crosstalk between the data line and the N1 node.

In the display substrate provided by the above embodiment, at least part of the orthographic projection of the first shielding pattern on the base substrate is located between the orthographic projection of the data line on the base substrate, and the orthographic projection of the second electrode plate on the base substrate, so that the first shielding pattern can shield the influence between the data line and the N2 node, and reduce the crosstalk between the data line and the N2 node.

In the display substrate provided by the above embodiment, at least part of the orthographic projection of the first shielding pattern on the base substrate is located between the orthographic projection of the data line on the base substrate, and the orthographic projection of the second electrode plate on the base substrate, so that the first shielding pattern can shield the influence between the data line and the N3 node, and reduce the crosstalk between the data line and the N3 node.

When the display device provided by the embodiments of the present disclosure includes the above-mentioned display substrate, it also has the above-mentioned beneficial effects, which will not be repeated here.

It should be noted that the display device can be any product or component with a display function such as a TV, a monitor, a digital photo frame, a mobile phone, a tablet computer, etc., wherein the display device also includes a flexible circuit board, a printed circuit board and a back panel,] etc.

It should be noted that the signal line extending along the X direction means that the signal line includes a main part and a secondary part connected to the main part, the main part is a line, a line segment or a bar shape, and the main part extends along the X direction, and the length of the main part along the X direction is greater than the length of the secondary part along other directions.

It should be noted that "same layer" in the embodiments of the present disclosure may refer to film layers on the same structural layer. Or, for example, the film layers in the same layer may be a layer structure formed by using the same film forming process to form a film layer for forming a specific pattern, and then using the same mask to pattern the film layer through a patterning process. Depending on the specific pattern, one patterning process may include a plurality of exposure, development or etching processes, and the specific pattern in the formed layer structure may be continuous or discontinuous. These specific patterns may also be at different heights or have different thicknesses.

In method embodiment of the present disclosure, the serial numbers of the steps cannot be used to limit the order of the steps. For those of ordinary skill in the art, the order of the steps can be changed without creative work. It is also within the protection scope of the present disclosure.

It should be noted that each embodiment in the present disclosure is described in a progressive manner, the same and similar parts of each embodiment can be referred to each other, and each embodiment focuses on the differences from other embodiments. In particular, for the method embodiments, since they are basically similar to the product embodiments, the description is relatively simple, and for relevant parts, part of the description of the product embodiments can be referred.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. "Comprising" or "including" and similar words mean that the elements or items appearing before the word include the elements or items listed after the word and their equivalents, without excluding other elements or items. Words such as "connected", "coupled" are not limited to physical or mechanical connections, but may include electrical connections, whether direct or indirect. "Up", "Down", "Left", "Right" and so on are only used to indicate the relative positional relationship. When the absolute position of the described object changes, the relative positional relationship may also change accordingly.

It will be understood that when an element such as a layer, film, region, or substrate is referred to as being "on" or "under" another element, it can be "directly on" or "under" the other element, or intervening elements may be present.

In the description of the above embodiments, specific features, structures, materials or characteristics may be combined in any one or more embodiments or examples in an appropriate manner.

The above embodiments are for illustrative purposes only, but the present disclosure is not limited thereto. Obviously, those skilled in the art may make further modifications and improvements without departing from the spirit of the present disclosure, and these modifications and improvements shall also fall within the scope of the present disclosure.

What is claimed is:

1. A display substrate, comprising a plurality of pixel driving circuits for driving a light emitting element, wherein the pixel driving circuit comprises:

a driving sub-circuit, a first terminal of the driving sub-circuit being coupled to a power supply line;

a compensation sub-circuit, respectively coupled to a scanning line, a control terminal of the driving sub-circuit, and a second terminal of the driving sub-circuit; configured to control to connect or disconnect the control terminal and the second terminal of the driving sub-circuit under the control of the scanning line;

a coupling sub-circuit, a first terminal of the coupling sub-circuit being coupled to the control terminal of the driving sub-circuit;

a storage sub-circuit, a first terminal of the storage sub-circuit being coupled to a second terminal of the coupling sub-circuit;

a data writing-in sub-circuit, respectively coupled to a second terminal of the storage sub-circuit, a data line, and a reset line; configured to control to connect or disconnect the second terminal of the storage sub-circuit and the data line under the control of the reset line;

a first reset sub-circuit, respectively coupled to the reset line, an initialization signal line, the control terminal of the driving sub-circuit, and the second terminal of the coupling sub-circuit; configured to, under the control of the reset line, control to connect or disconnect the initialization signal line and the control terminal of the driving sub-circuit and control to connect or disconnect the initialization signal line and the second terminal of the coupling sub-circuit;

a first maintenance sub-circuit, respectively coupled to the scanning line, the second terminal of the coupling sub-circuit, and the initialization signal line; configured to control to connect or disconnect the second terminal of the coupling sub-circuit and the initialization signal line under the control of the scanning line; and a second maintenance sub-circuit, respectively coupled to the a first control line, a reference signal line and the second terminal of the storage sub-circuit; configured to control to connect or disconnect the reference signal line and the second terminal of the storage sub-circuit under the control of the first control line;

wherein the pixel driving circuit comprises a first capacitor and a third transistor, and the first capacitor includes a first electrode plate and a second electrode plate oppositely arranged, and the first electrode plate is multiplexed as a gate electrode of the third transistor;

the display substrate includes:

a plurality of data lines, wherein the data line includes at least a portion extending along the first direction, an orthographic projection of the data line on a base substrate of the display substrate and an orthographic projection of the first electrode plate on the base substrate are arranged along a second direction, the first direction intersects the second direction;

a plurality of first shielding patterns, wherein at least part of an orthographic projection of the first shielding pattern on the base substrate is located between the orthographic projection of the data line on the base substrate and the orthographic projection of the first electrode plate on the base substrate; and/or at least part of the orthographic projection of the first shielding pattern on the base substrate is located between the orthographic projection of the data line on the base substrate and an orthographic projection of the second electrode plate on the base substrate;

wherein the pixel driving circuit further comprises a second capacitor, the second capacitor includes a third electrode plate and a fourth electrode plate oppositely arranged, the third electrode plate is coupled to the second electrode plate;

the third electrode plate and the second electrode plate are arranged along the first direction;

at least part of the orthographic projection of the first shielding pattern on the base substrate is located between the orthographic projection of the data line on the base substrate and an orthographic projection of the third electrode plate on the base substrate and/or, at least part of the orthographic projection of the first shielding pattern on the base substrate is located between the orthographic projection of the data line on the base substrate and an orthographic projection of the fourth electrode plate on the base substrate.

2. The display substrate according to claim 1, wherein the pixel driving circuit further comprises:

a light emitting control sub-circuit, respectively coupled to the second terminal of the driving sub-circuit, the light emitting element and a second control line; configured to control to connect or disconnect the second terminal of the driving sub-circuit and the light emitting element under the control of the second control line.

3. The display substrate according to claim 2, wherein the pixel driving circuit further comprises:

a second reset sub-circuit, respectively coupled to the scanning line, the light emitting element and the initialization signal line; and configured to control to connect or disconnect the light emitting element and the initialization signal line under the control of the scanning line.

4. The display substrate according to claim 3, wherein the coupling sub-circuit includes a first capacitor, the storage sub-circuit includes a second capacitor, the data writing-in sub-circuit includes a first transistor, the compensation sub-circuit includes a second transistor, the driving sub-circuit includes a third transistor, the first reset sub-circuit includes a fourth transistor and a fifth transistor, the second reset sub-circuit includes a sixth transistor, the first maintenance sub-circuit includes a seventh transistor, the light emitting control sub-circuit includes an eighth transistor, and the second maintenance sub-circuit includes a ninth transistor;

a gate electrode of the first transistor is coupled to the reset line, a first electrode of the first transistor is coupled to the data line, and a second electrode of the first transistor is coupled to a second terminal of the second capacitor;

a gate electrode of the second transistor is coupled to the scanning line, a first electrode of the second transistor is coupled to a second electrode of the third transistor, and a second electrode of the second transistor is coupled to a gate electrode of the third transistor;

a first electrode of the third transistor is coupled to the power supply line;

a first terminal of the first capacitor is coupled to the gate electrode of the third transistor, and a first terminal of the second capacitor is coupled to a second terminal of the first capacitor;

a gate electrode of the fourth transistor is coupled to the reset line, a first electrode of the fourth transistor is coupled to the initialization signal line, and a second electrode of the fourth transistor is coupled to the gate electrode of the third transistor;

a gate electrode of the fifth transistor is coupled to the reset line, a first electrode of the fifth transistor is coupled to the initialization signal line, and a second electrode of the fifth transistor is coupled to the second terminal of the first capacitor;

a gate electrode of the sixth transistor is coupled to the scanning line, a first electrode of the sixth transistor is coupled to the initialization signal line, and a second electrode of the sixth transistor is coupled to the light emitting element;

a gate electrode of the seventh transistor is coupled to the scanning line, a first electrode of the seventh transistor is coupled to the initialization signal line, a second electrode of the seventh transistor is coupled to the second terminal of the first capacitor;

a gate electrode of the eighth transistor is coupled to the second control line, a first electrode of the eighth transistor is coupled to the second electrode of the third transistor, and a second electrode of the eighth transistor is coupled to the light emitting element;

a gate electrode of the ninth transistor is coupled to the first control line, a first electrode of the ninth transistor is coupled to the reference signal line, and a second electrode of the ninth transistor is coupled to the second terminal of the second capacitor.

5. The display substrate according to claim 1, wherein the first shielding pattern comprises a first shielding portion and a second shielding portion coupled to each other, the first shielding portion and the second shielding portion are arranged along the second direction, and at least part of the orthographic projection of the data line on the base substrate is located between an orthographic projection of the first shielding portion on the base substrate and an orthographic projection of the second shielding portion on the base substrate;

at least part of the orthographic projection of the first shielding portion on the base substrate is located between an orthographic projection of at least one of a first capacitor and a second capacitor adjacent to the first shielding portion on the base substrate and the orthographic projection of the data line on the base substrate; and/or, at least part of the orthographic projection of the second shielding portion on the base substrate is located between an orthographic projection of at least one of a first capacitor and a second capacitor adjacent to the second shielding portion on the base substrate and the orthographic projection of the data line on the base substrate.

6. The display substrate according to claim 5, wherein the display substrate further comprises a second conductive connection portion and the data line; the pixel driving circuit further includes a first transistor, a first electrode of the first transistor is coupled to a corresponding data line, and a second electrode of the first transistor is coupled to the fourth electrode plate through a corresponding second conductive connection portion; the second conductive connection portion is located between adjacent first shielding patterns along the second direction.

7. The display substrate according to claim 5, wherein the display substrate further comprises a third conductive connection portion and a fifth conductive connection portion;

the pixel driving circuit further includes a second transistor and a third transistor, a second electrode of the second transistor is coupled to a gate electrode of the third transistor through the third conductive connection portion, a second electrode of the fifth transistor is coupled to the second electrode plate through the fifth conductive connection portion;

the third conductive connection portion is located between adjacent first shielding patterns along the second direction, and the fifth conductive connection portion is located between adjacent first shielding patterns along the second direction.

8. The display substrate according to claim 7, wherein the display substrate further comprises:

a plurality of shielding lines each including at least a portion extending along the second direction;

the plurality of pixel driving circuits are divided into a plurality of rows of pixel driving circuits, and an orthographic projection of the shielding line on the base substrate at least partially overlaps an orthographic projections of an edge of each first electrode plate in a corresponding row of pixel driving circuits close to the fourth electrode plate on the base substrate.

9. The display substrate according to claim 8, wherein the plurality of first shielding patterns are divided into a plurality of rows of first shielding patterns, and the shielding line is respectively coupled to a corresponding row of first shielding patterns.

10. The display substrate according to claim 9, wherein the display substrate comprises a power supply line, and the first shielding pattern is coupled to the power supply line; or wherein the first shielding pattern and the shielding line are arranged on a same layer as the third conductive connection portion.

11. The display substrate according to claim 8, wherein the display substrate further comprises a reset line, and the shielding line and the reset line are arranged along the first direction; the third conductive connection portion and the fifth conductive connection portion are located between the shielding line and the reset line.

12. The display substrate according to claim 1, wherein the display substrate further comprises:

a plurality of second shielding patterns, wherein the second shielding pattern includes at least a portion extending along the first direction, an orthographic projection of the second shielding pattern on the base substrate at least partially overlaps the orthographic projection of the data line on the base substrate.

13. The display substrate according to claim 12, wherein the display substrate further comprises a plurality of second control lines; second shielding patterns located in a same row along the second direction are respectively coupled to a corresponding second control line;

wherein the second shielding patterns located in the same row along the second direction and the corresponding second control line form an integral structure.

14. The display substrate according to claim 12, wherein the display substrate further comprises a power supply line and an initialization signal line, and the second shield pattern is coupled to the power supply line or the initialization signal line.

15. The display substrate according to claim 1, wherein the display substrate further comprises:

a plurality of initialization signal lines arranged along the first direction, the initialization signal line including at least a portion extending along the second direction;

a plurality of initial connection lines arranged along the second direction, the initial connection line including at least a portion extending along the first direction, each initial connection line being respectively coupled to the plurality of initialization signal lines;

wherein the display substrate further comprises:

a plurality of reference signal lines arranged in the first direction, the reference signal line including at least a portion extending along the second direction;

a plurality of reference connection lines arranged along the second direction, the reference connection line including at least a portion extending along the first direction, each reference connection line is respectively connected to the plurality of reference signal lines;

wherein the initial connection lines and the reference connection lines are arranged alternately along the second direction;

the plurality of pixel driving circuits are divided into a plurality of columns of pixel driving circuits, each column of pixel driving circuits correspond to one initial connection line or correspond to one reference connection line;

an orthographic projection of the initial connection line on the base substrate at least partially overlaps an orthographic projection of the second electrode plate in the corresponding column of pixel driving circuits on the base substrate; and/or, an orthographic projection of the reference connection line on the base substrate at least partially overlaps the orthographic projection of the second electrode plate in the corresponding column of pixel driving circuits on the base substrate.

16. The display substrate according to claim 7, wherein the display substrate further comprises a plurality of reset lines, and the reset line includes at least a portion extending along the second direction, and the reset lines and the third conductive connection portion are arranged on a same layer.

17. The display substrate according to claim 1, wherein the pixel driving circuit includes a second transistor, a fourth transistor, a fifth transistor and a seventh transistor, the second transistor, the fourth transistor, the fifth transistor and the seventh transistor adopt a double-gate structure.

18. A display device, comprising the display substrate according to claim 1.

* * * * *